(12) United States Patent
Marko

(10) Patent No.: US 10,009,714 B2
(45) Date of Patent: Jun. 26, 2018

(54) SYSTEM AND METHOD FOR IMPROVING TELEMATICS LOCATION INFORMATION AND RELIABILITY OF E911 CALLS

(71) Applicant: Sirius XM Radio Inc., New York, NY (US)

(72) Inventor: Paul D. Marko, Pembroke Pines, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days. days.

(21) Appl. No.: 14/359,535

(22) PCT Filed: Dec. 6, 2012

(86) PCT No.: PCT/US2012/068318
§ 371 (c)(1),
(2) Date: May 20, 2014

(87) PCT Pub. No.: WO2013/086244
PCT Pub. Date: Jun. 13, 2013

(65) Prior Publication Data
US 2014/0295885 A1 Oct. 2, 2014

Related U.S. Application Data

(60) Provisional application No. 61/567,370, filed on Dec. 6, 2011.

(51) Int. Cl.
*H04W 4/02* (2018.01)
*H04W 76/50* (2018.01)
*H04W 64/00* (2009.01)

(52) U.S. Cl.
CPC ............ *H04W 4/02* (2013.01); *H04W 76/50* (2018.02); *H04W 64/00* (2013.01)

(58) Field of Classification Search
CPC ..... H04W 4/02; H04W 76/007; H04W 64/00; B60C 23/0408; B60C 23/0425; B60C 23/0416
See application file for complete search history.

(56) References Cited

U.S. PATENT DOCUMENTS 6,516,198 B1 2/2003 Tendler
7,130,641 B1 10/2006 Al-Khashti et al.
(Continued)

FOREIGN PATENT DOCUMENTS

WO WO 2005112488 A2 * 11/2005 ............. H04W 4/22

OTHER PUBLICATIONS

Wireless Phase I & II Features & Functions Operational Information Document (OID), Published by NENA, Document 57-501, Jan. 20, 2003, 22 pages.
(Continued)

*Primary Examiner* — Kamran Afshar
*Assistant Examiner* — Minjung Kim
(74) *Attorney, Agent, or Firm* — Kramer Levin Naftalis & Frankel LLP

(57) ABSTRACT

System, devices and methods are provided to automatically initiate an enhanced 911 (E911) call from a telematics control unit (TCU) (e.g., a TCU deployed with cellular modem or mobile phone in a vehicle) to an answering point (e.g. public safety answering point or access point (PSAP)). A wireless carrier (e.g., mobile service center (MSC)) employs a positioning determining entity (PDE) and algorithm to improve caller location determination using information provided by the TCU (e.g., GPS and dead reckoning information generated at the vehicle) and network location information when needed, and provides PDE estimated location of the caller to the PSAP (e.g., using a data channel and optionally a voice channel) to mitigate errors in TCU location data and reduce potentially conflicting location information provided to PSAPs from TCUs and wireless carriers or other phone service providers.

14 Claims, 14 Drawing Sheets

(56) References Cited

U.S. PATENT DOCUMENTS

| | | | |
|---|---|---|---|
| 7,323,973 B1 | 1/2008 | Ceglia et al. | |
| 7,496,354 B2 | 2/2009 | Steingruebner | |
| 8,818,324 B1* | 8/2014 | Hines, III | G01S 5/0205 |
| | | | 455/404.1 |
| 2005/0130623 A1* | 6/2005 | Narhi | H04M 1/72536 |
| | | | 455/404.1 |
| 2005/0143912 A1* | 6/2005 | Park | G08G 1/096827 |
| | | | 701/455 |
| 2006/0129638 A1* | 6/2006 | Deakin | H04W 8/22 |
| | | | 709/203 |
| 2007/0135089 A1 | 6/2007 | Edge et al. | |
| 2009/0168974 A1* | 7/2009 | Mc Cormick | H04M 11/04 |
| | | | 379/45 |
| 2009/0280832 A1* | 11/2009 | Karaoguz | G01C 21/20 |
| | | | 455/456.2 |
| 2010/0318292 A1* | 12/2010 | Kulik | G01C 21/165 |
| | | | 701/414 |
| 2011/0092225 A1* | 4/2011 | Long | G01S 19/05 |
| | | | 455/456.1 |
| 2011/0117924 A1* | 5/2011 | Brunner | G01S 5/0252 |
| | | | 455/456.1 |
| 2012/0235807 A1 | 9/2012 | Rysenga et al. | |

OTHER PUBLICATIONS

Dead Reckoning for Consumer Electronics; by Mark Amundson, Honeywell, 2006, 4 pages.

PSAP Operations Guide for Wireless 9-1-1, Intrado Informed Response™, Jul. 2005, 27 pages.

* cited by examiner

SYSTEM AND METHOD FOR IMPROVING TELEMATICS LOCATION INFORMATION AND RELIABILITY OF E911 CALLS

FIELD OF THE INVENTION

Illustrative embodiments of the present invention relate generally to telematics safety and/or security services and, more particularly, to systems and methods for providing improved location information for callers or users requiring telematics safety and/or security service(s).

BACKGROUND OF THE INVENTION

Telematics safety and security services (TSSS) can be provided in vehicles to automatically place a call to summon emergency services in the event of an accident. For example, Ford Motor Company offers a vehicle telematics control unit (e.g., a Ford SYNCH™ unit) that is a factory-installed, integrated in-vehicle communications and entertainment system that can be tethered to the user's cell phone (e.g., via Bluetooth® radio connection) to control automated calls for 911 assistance, as well as allow users to make hands-free telephone calls, control music and perform other functions with the use of voice commands. In the event that a vehicle airbag is deployed, the vehicle telematics unit can automatically initiate an automatic collision notification (ACN) call to Enhanced 911 (E911) emergency authorities via a public safety answering point or public-safety access point (PSAP). It is important that the correct vehicle location is provided to the emergency operator during an ACN call because this information is used to direct emergency services to the location of the vehicle.

An example E911 system for handling a wireless E911 call from a mobile TCU such as a Ford SYNCH™ unit is shown in FIG. 1A. As explained below, emergency response operations of existing E911 systems can be negatively impacted by inaccurate and sometimes conflicting call location information.

A PSAP 170 is a call center responsible for answering calls to an emergency telephone number (e.g., 9-1-1 in the United States) or other telephone number designated for requesting police, firefighting and ambulance services. A PSAP 170 generally employs human operators who are trained to dispatch these emergency services depending on information received via the emergency call. There are a number of PSAPs in the United States (e.g., approximately 6100 PSAPs serving different geographical areas or jurisdictions that may overlap), and they are usually funded and maintained by a government agency or public entity (e.g., a county, a large city, or a municipality). Most PSAPs have a regional Emergency Service Number (ESN) or other number identifying the PSAP 170. Enhanced 9-1-1 or E911 refers to the ability of PSAP equipment to display to the operators such information as callback number of calling party, wireless carrier name and cell sector address or other location information. As explained below, because PSAPs are generally publically funded (i.e., unlike commercially owned and operated call centers), they are not as easily upgraded to process improved location information provided by the calling telematics control unit and/or the wireless network.

With reference to FIG. 1A, E911 calls from persons requiring emergency services are generally routed to a selected PSAP based on caller location by a 911 selective router 160 that can access a database of PSAP information (not shown). For example, for wireline 911 calls, the customer number (i.e., automatic number identification or ANI assigned to that customer) is associated with a particular ESN in the 911 selective router database. For wireless 9-1-1 calls, however, a pseudo-ANI or p-ANI is assigned to each sector of a cell site 110, and the p-ANIs are associated with a particular PSAP ESN in the database for routing according to E911 Phase I described below. That is, a wireless 9-1-1 call is initially received at a cell site 110 which is a radio transceiver base station that acts as a point of entry for calls from wireless devices into a wireless carrier's telecommunications network. The geographical area served by a cell site is divided into coverage areas of one or more sectors (e.g., receiving antennas on the base station or tower). For example, cell site with 1 sector (Omni) is common in rural areas where maximum coverage is most desired; whereas a cell site with three or more sectors is common in urban areas where call volume is more of an issue.

The database of PSAP information (not shown) employed by the selective router 160 can also allow determining the appropriate PSAP based on cross-referencing stored PSAP locations such as street addresses and/or corresponding earth coordinates (e.g., longitude and latitude) with coordinates of a wireless phone if available. Using an ANI or p-ANI or phone coordinates, the 911 selective router 160 can access and retrieve a corresponding ESN from the database to route the 911 call to the appropriate PSAP 170. Calls can also be relayed between PSAPs when, for example, a city operates its own PSAP but not its own particular emergency service (e.g., the city has a city police force but relies on a county-funded fire department).

In contrast to the wireless network depicted in FIG. 1A, when a wireline phone is used to call 9-1-1 via the public switched telephone network (PSTN) (i.e., a wireline enhanced 911 call is placed), the 911 call from the wireline telephone is sent to a local central office that serves that specific telephone. The central office processes a 911 call by forwarding the call to a selective router (e.g., 911 selective router 160). The 911 selective router, in turn, routes the voice associated with the call, as well as data comprising the caller's telephone number or ANI to an appropriate PSAP. As stated above, the 911 selective router uses the ANI to look up the ESN of the appropriate call center (i.e., PSAP) in the E911 selective router database and connect the call. Caller address information is not passed along by the public phone network, that is, only the caller's phone number or ANI is passed. The PSAP uses the calling party number to look up the address in an Automatic Location Identification (ALI) database 150. Most ALI databases have a companion database known as the Master Street Address Guide (MSAG). The MSAG describes the exact spelling of streets, street number ranges, and other address elements. When a new PSTN telephone customer account is created, for example, the customer billing address, for example, is looked up in the MSAG to find the appropriate ESN that 911 calls from that phone number should be routed to. If the phone number is not passed, or the phone number is not in the ALI database (i.e., "ALI Failure" occurs), the call is then passed to the trunk group's default ESN, which is a PSAP designated for this function. The PSAP operator must then ask the incoming caller for their location and redirect them to the correct PSAP.

Unlike wireline enhanced 911 calls, when a wireless enhanced 911 call is made as illustrated in FIG. 1A, the billing address associated with a cell phone is not necessarily the location to which emergency responders should be sent, since the device is portable. This means that locating the caller is more complicated than merely using an ANI, and there is a different set of legal requirements. For example, the U.S. Federal Communications Commission (FCC) has promulgated several requirements applicable to wireless or mobile telephones (e.g., as set forth in 47 C.F.R. § 20.18), some of which are discussed below:

Basic 911: All 911 calls must be relayed to a call center, regardless of whether the mobile phone user is a customer of the network being used.

E911 Phase 1: Beginning in April 1998, wireless network operators must identify the phone number and cell phone tower used by callers, within six minutes of a request by a PSAP.

E911 Phase 2: Beginning in October 2001, wireless network operators must provide Automatic Location Information (ALI) for 911 calls with the following accuracy:

Network Based Technology 100 meters for 67% of calls
300 meters for 95% of calls
Handset Based Technology 50 meters for 67% of calls
150 meters for 95% of calls
95% of a network operator's in-service phones must be E911 compliant ("location capable") by Dec. 31, 2005

Thus, for E911 Phase I which began in April 1998, wireless carriers were merely required to provide a PSAP 170 with the phone number of the 911 wireless call originator and identification of the originating cell site 110 and sector (e.g., a street address associated with the receiving cell tower and cell face directional such as NNW, NW, ESE, SE, Omni or Tall, etc.) in the wireless network that handled the 911 call.

At the time of required E911 Phase I compliance, the location of the originating cell site and sector was deemed to provide a sufficient level of location information to allow delivery of the 9-1-1 call to the appropriate PSAP and, through that PSAP, the delivery of emergency services to the caller. E911 Phase II, however, requires that the mobile telephone number and location of the caller be within a specified accuracy margin and delivered to the call taker (e.g., PSAP) in the form of earth coordinates (e.g., latitude and longitude). As will be explained in connection with FIG. 1A, Phase II compliance requires the incorporation of new components and/or operations into the wireless infrastructure to determine and provide the specific location information, as well as for the ability for the call taker (e.g., PSAP) to receive and use the specific location information.

With continued reference to FIG. 1A, wireless network operators can use different wireless E911 solutions to provide voice (e.g., the caller's voice input) and data (e.g., the phone number of a 911 wireless call originator and cell site location information) to a PSAP 160 from their wireless network. One solution (i.e., a Non-Call-path Associated Signaling (NCAS)) uses a mobile positioning center (MPC) 140 to provide data to both a mobile switching center (MSC) 120 and an ALI database 150. The MSC 120, which can also be referred to as a MTSO or MSO, is a switch that serves as an entry point for wireless calls received from multiple cell site sectors into the PSTN. The MSC 120 provides stored program control for wireless call processing, and identifies the switching office that processes the cellular call to the PSTN. The ALI database 150 is a host computer system that stores ALI records to facilitate the display of, for example, a name and address of the wireless service provider or carrier for the phone used to dial 9-1-1 and the callback number, to the call taker or operator at the PSAP 170. In a NCAS solution, calls are routed by two separate paths to the PSAP 170, that is, a voice path and a data path. Voice (e.g., caller voice input) is sent via the voice path from the mobile phone or device (e.g. TCU 100) to the MSC 120 via one or more cell towers 110, and then to a selected PSAP 170 by way of the 911 selective router 160 once an Emergency Service Routing Key (ESRK) is provided from the MPC 140 via the data path as explained below.

For example, the MPC 140 receives the callback number of the calling mobile device 100 and at least Phase I data cell sector location information data from the MSC 120 and generates an ALI record in the ALI database 150 that is indexed via an ESRK assigned to the call. The MPC 140 can provide the ESRK to the MSC 120 via the data path; the MSC 120, in turn, provides the voice call and a routing number (e.g., the ESRK) to the PSAP 170 via the voice path. When the PSAP 170 receives the voice call via the voice path, the PSAP 170 uses the ESRK to retrieve a record from the ALI database 150 that contains the callback number and cell site location.

The MPC 140 can also receive Phase II data (i.e., caller location data comprising latitude and longitude coordinates) and provide it to the PSAP 170 via a record from the ALI database 150. Since Wireless E911 Phase II requires that the specific location of the caller be delivered to the PSAP 170 in the form of earth coordinates (e.g., latitude, longitude or X,Y), a positioning determining entity (PDE) 130 is incorporated into the wireless telephone network infrastructure to perform calculations that identify the geographic location of a mobile unit. The PDE determines the position of a wireless terminal when the mobile device starts a call or while the mobile device is engaged in a call, and can support one or more position determining technologies. The FCC defines two types of position determining technology, that is, network-based and handset-based. Network-based means that the components needed to determine location are embedded into the wireless E911 network, such as at the MSC 120 and/or cell sites 110. Handset-based means that some of the location technology is embedded into the mobile device (e.g., wireless handset) such as a Geographical Positioning System (GPS) chip or software modifications. The PDE receives location data from the base stations $110_1$-$110_n$ and GPS information sources, performs calculations (e.g., using one or more position determining technologies or algorithms), and reports a position point or location (e.g., X,Y) back to the network (e.g., MPC and MSC) for use in the data path described above (e.g., to obtain ESRK from MPC and provide ESRK, callback number and location to the ALI database of the PSAP 150). The GPS coordinates received from a mobile device, however, are often subject to errors and may not result in a very accurate PDE estimated location, even if compared with map database information. Further, network-based position determining technology (e.g., triangulation) may likewise be less accurate than if accurate GPS coordinates could be provided by mobile device.

Phase II solutions provide two alternative methods for determining the PSAP 170 to which a wireless 9-1-1 call will be routed. If coordinates (e.g., X,Y) of the wireless device placing the emergency call are available from the PDE within the requisite routing interval (e.g., 9-1-1 calls are generally routed to a PSAP in 5 seconds or less), those coordinates can be used to determine the appropriate routing of the call. If the coordinates are not available in time to route the call, then routing based on cell site/sector location information as established for Phase I will be used.

The provision of Phase II information (e.g., latitude, longitude coordinates) in the voice path of an E911 call will now be described with reference to FIG. 1B. For example, the mobile device 100 (e.g., a vehicle TCU such as the Ford SYNCH™ unit) can be provided with a Global Positioning System (GPS) receiver to locate the TCU geographically. The Ford SYNCH™ unit has a 911 Assistance application which places a direct call to a local 911 emergency operator in the event of a serious accident with an air bag deployment as indicated at 115. As indicated at 121, the E911 call is routed to the PSAP using Phase I or Phase II data as described above. At 125, a pre-recorded voice message will play when the call is answered which provides a verbal explanation that the vehicle occupants require emergency assistance, and a verbal (e.g., speech synthesized) report of GPS coordinates of the vehicle obtained from the unit's GPS receiver over the voice path. The message can also provide a call taker (e.g., PSAP operator) with instructions to enter a designated DTMF tone to repeat the message with coordinates or to open the voice path (e.g., as indicated at 129, 131 and 133) to allow the 911 operator to communicate directly with the vehicle occupants. As indicated at 127, the PSAP can record the voice accident information from the message (e.g., vehicle coordinates) and use it to dispatch services.

Disadvantages of the wireless E911 solution depicted in FIG. 1A and the TCU 100 described with reference to FIG. 1B are that the TCU location coordinates provided in the voice message in the voice path at 125 may be inaccurate. Also, the MPC 140 may provide the PSAP 170 (e.g., via the ALI database 150) with caller location information via the data path (e.g., using the afore-mentioned network-based means to obtain Phase II data) that conflicts with the information received by PSAP 170 via the voice path.

For example, the TCU GPS receiver generates location information based on the availability of GPS satellites. Increasingly dense urban environments pose a significant problem to navigation systems based on the reception of extremely weak GPS satellite signals. In the event there is substantial blockage of the GPS satellite signals and position cannot be accurately computed (e.g., when driving in tunnels or through urban canyons, or when a mobile TCU is used indoors, etc.), the TCU can rely on GPS assist technology or dead reckoning to estimate the vehicle location. It is possible, however, for errors to be present in the location provided by the TCU using TCU-based GPS assist or dead reckoning.

TCU-based GPS assist technology processes information from multiple sources (e.g., wheel rotation information to estimate distance traveled from the last GPS location, electronic gyroscope information to estimate changes in the vehicle direction, accelerometer, etc.) to estimate the vehicle location. Dead reckoning aids traditional GPS navigation via intelligent algorithms based on a vehicle's distance and directional changes during GPS signal interruption. Dead reckoning or deduced reckoning calculates a user's or vehicle's current position using a previously determined position (e.g., GPS fix) and advances that position using known or estimated speeds (e.g., using sensors such as pedometer, accelerometer, wheel tick counter, and so on) over elapsed time and course. Thus, errors may be present in the location provided by the TCU using TCU-based GPS assist or dead reckoning due to an inaccurate estimate of distance traveled, direction traveled, or both from the last reliable GPS fix. For instance, vehicle distance errors may be caused by an inaccurate estimate of the tire diameter applied to the rotation information received from the wheel tick counter.

TCU-based GPS assist algorithms normally calibrate tire diameter by measuring wheel revolutions and distance traveled while the GPS signal is strong to allow for accurate estimations when GPS signal is weak. Direction errors are more problematic due to drift rates of the electronic gyroscope technology provided in the vehicle. For example, if a driver in an urban canyon turns and then stops due to traffic, and the gyroscope drifts by 8 degrees during the turn, the new heading will be off by 8 degrees. If the driver continues straight for another ⅓ of a mile, the TCU estimated location will be off by a city block.

Vehicle navigation systems usually mitigate this problem by adjusting the new heading to keep the vehicle path fixed based on street coordinates defined in a navigation system map database in the TCU, thereby preventing the vehicle track to drift to an adjacent street. Although combining wheel rotation and gyroscope information with a map database can be an effective solution for improving the accuracy of the location estimation, the map databases can be expensive. Thus, it may not be cost effective to integrate a map database into TCUs.

Accordingly, some telematics service providers (TSP) such as OnStar Corporation manage dedicated call centers with trained operators for handling automated accident notification calls from their subscribers. These call centers are equipped to receive custom data messages from the TCU in addition to vehicle location, such as accident severity, number of vehicle occupants, vehicle roll over and other information that may be available from vehicle sensors. Operators at the TSPs are trained to communicate with the vehicle occupants, contact the appropriate PSAP to transfer the accident information, and ensure that the proper emergency services are dispatched. Dedicated call centers also improve the accuracy of the reported TCU location by post-processing, for example, the latitude and longitude coordinates, that is, reverse geocoding the latitude and longitude coordinates against map data to locate a street address (e.g., using a locally stored map database to assign a non-location value such as a street address to latitude and longitude coordinates), which is a more cost effective approach than integrating a map database in the TCU.

Although dedicated emergency call centers set up by TSPs can be effective, costs associated with establishing and maintaining call centers to provide the automated collision notification (ACN) service can be prohibitively expensive. For example, to recover the call center costs, TSPs must charge subscribers higher fees for the automated accident notification service, which reduces the number of drivers capable of paying for the service.

A need therefore exists for a method and system for providing improved caller location data for use by E911 systems, and without requiring, for example, commercial call centers or map databases in the TCU. Further, a need exists for a method and system that reduces the likelihood that a PSAP or other answering point receives conflicting location information from network-based and TCU-based location information sources. Such conflicting location information results in different location data being received on the voice and data paths of a wireless E911 system, which can impair a PSAP operator's reaction time and decision-making abilities when processing an E911 call and therefore delay the dispatch of emergency responders and their operations.

Further, a need exists for providing accurate E911 Phase II location information to PSAPs that may not be equipped to receive it. PSAPs have the financial resources to provide E911 Phase II services. Since they are generally constrained by municipal or government agency budgets and funding measures, and they are not required by the FCC to fulfill the FCC requirements, a number of PSAPs do not have the Phase II capability to receive location coordinates from the cellular infrastructure.

For example, some PSAPs operator terminals are not able to display location coordinates, which can occur when the ALI format in the PSAPs existing ALI database has not been modified to allow display of latitude and longitude coordinates on the PSAPs operator terminal screen. Some PSAPs do not have the capability of communicating with a MPC 140 and its data path to receive an ALI push (e.g., ESRK, location information and callback number to store in the ALI database 150) for later access by the PSAP with the ESRK received via the voice path. In such instances, the caller's voice and callback number are delivered to the PSAP via the voice path only, that is, MSC forwards the callback number along with the voice using a routing number called an emergency services routing digit (ESRD) that mimics an ANI for 911 call routing (e.g., the ESRD is pre-provisioned in the 911 selective router 160 and the ALI database 150 to route a call based on the cell sector that received it), and no other location data is sent to the PSAP. Thus, a need exists for a method and system for allowing caller location information or other telematics safety and/or security services (TSSS) information to be transferred in a voice path to the PSAP during an E911 call, for example, to guarantee that TCU location coordinates can be relayed to PSAPs lacking Phase II capabilities.

SUMMARY OF THE INVENTION

In accordance with illustrative embodiments of the present invention, methods and apparatuses provide wireless telematics device location information to an access point by receiving, at a wireless network switch device, location information generated at the telematics device comprising at least one of current position coordinates, and tracking information comprising at least one previous position coordinate; determining, by a computer, if the telematics device can provide tracking information; determining a network-based location of the telematics device using received signal information corresponding to signals received from the telematics device at cellular base stations; determining an estimated location using the current position coordinates and the network-based location when the telematics device cannot provide tracking information; and determining an estimated location using the tracking information when the telematics device can provide the tracking information.

In accordance with aspects of illustrative embodiments of the present invention, the estimated location is transmitted to the access point on a voice channel using at least one of an audio message and a textphone message that comprises the estimated location and is generated at the wireless network switch device.

In accordance with aspects of illustrative embodiments of the present invention, the estimated location is transmitted to the telematics device. The telematics device generates at least one of an audio message and a textphone message that comprises the estimated location.

In accordance with illustrative embodiments of the present invention, apparatuses and methods provide wireless telematics device location information to an access point during an emergency call by establishing a voice channel to an access point in response to the telematics device initiating an emergency call via a wireless network switch; receiving, at the wireless network switch, location information generated at the telematics device comprising recent position coordinates; generating, at the wireless network switch device, at least one of an audio message and a textphone message that comprises the telematics device location information; and transmitting the at least one of an audio message and a textphone message to the access point on the voice channel.

BRIEF DESCRIPTION OF THE DRAWINGS

The invention will be more readily understood with reference to the illustrative embodiments thereof as shown in the attached drawing figures, in which.

Throughout the drawing figures, like reference numbers can be understood to refer to like elements, features and structures.

DETAILED DESCRIPTION OF ILLUSTRATIVE EMBODIMENTS

In accordance with illustrative embodiments of the present invention, example TCUs, and methods of operating TCUs in conjunction with other components in a wireless telematics safety and/or security services (TSSS) system (e.g., switches, mobile service centers (MSCs), PSAPs, mobile positioning centers (MPCs), positioning determining entities (PDEs), and/or Teletypewriter (TTY) devices or Telecommunication Devices for the Deaf (TDD), among other system entities or components) are disclosed herein to improve determination of estimated wireless caller location, and to improve reporting of accurate estimated wireless caller location to answering points such as PSAPs.

A LIST OF ABBREVIATIONS USED
THROUGHOUT THE TEXT FOLLOWS

Figure 1A:
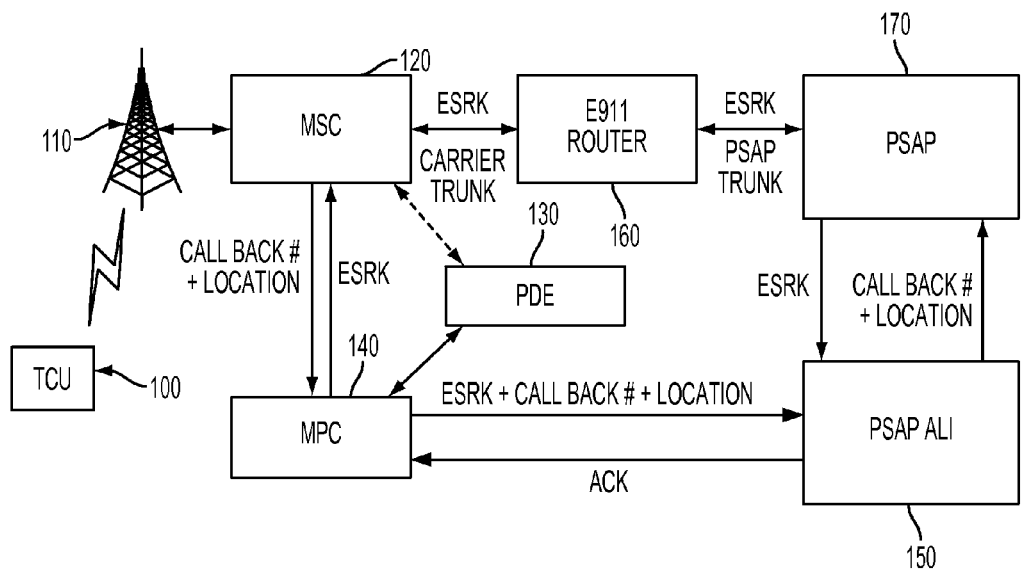
FIG. 1A depicts an illustrative TSSS system for processing an E911 call from a TCU in a wireless network.
Figure 1B:
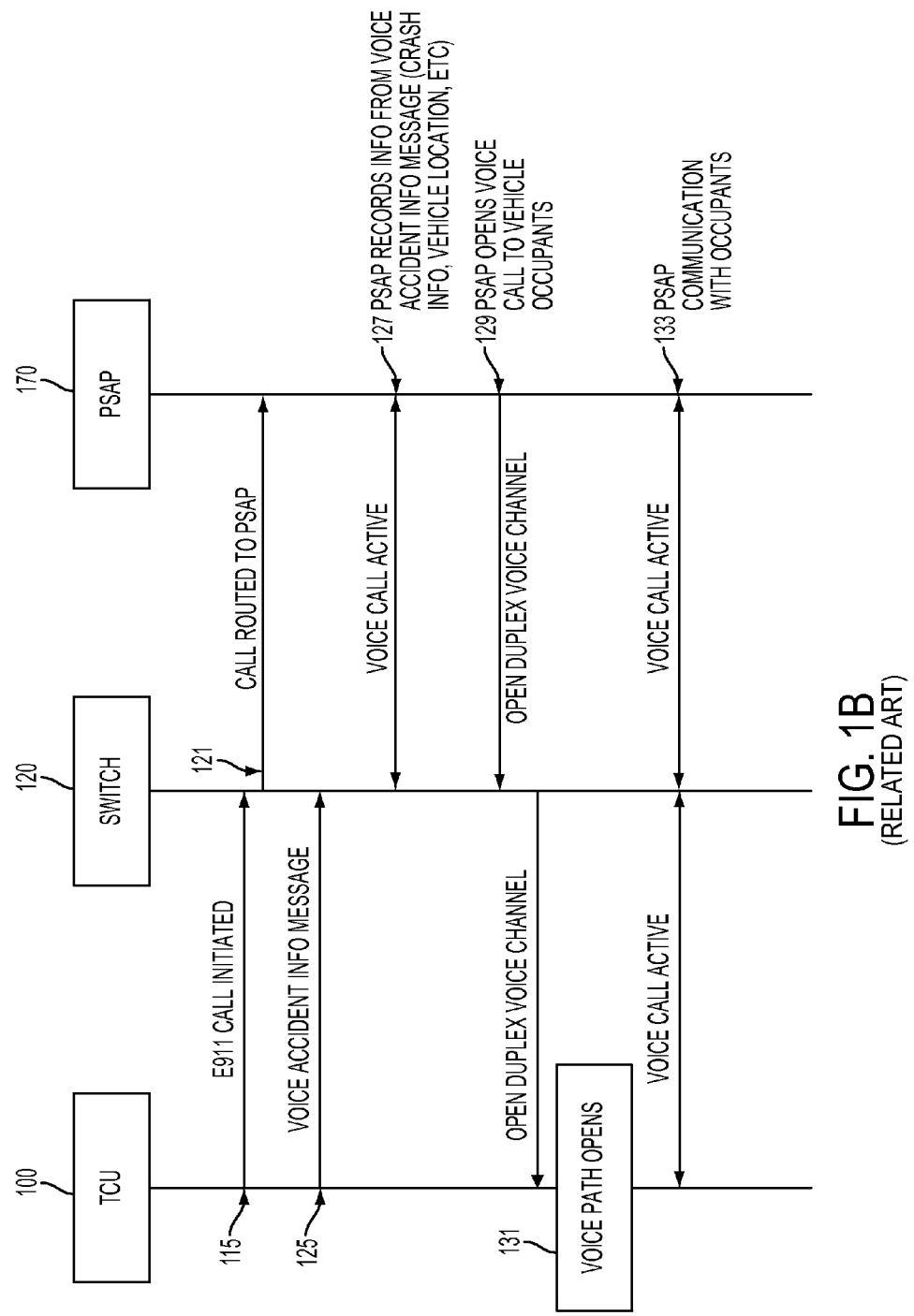
FIG. 1B depicts E911 call processing using an existing vehicle-installed TCU.

ACN Automatic Collision Notification
ALI Automatic Location Identification
ANI Automatic Number Identification
E911 Enhanced 9-1-1 service
ESN Emergency Service Number
ESRD Emergency Services Routing Digits
ESRK Emergency Services Routing Key
FCC Federal Communications Commission
GPS Global Positioning System
MPC Mobile Positioning Center
MSC Mobile Switching Center
NCAS Non-Call Path Associated Signaling
PDE Positioning Determining Equipment or entity
PSAP Public Service Answering or Access Point
PSTN Public Switched Telephone Network
TCU Telematics Control Unit
TDD Telecommunication Devices for the Deaf
TSP Telematics Service Provider
TSSS Telematics Safety and/or Security Services
TTY Teletypewriter device Overview of TCU, MSC and PDE Operations in a E911 Wireless Network For example, a TCU constructed to operate in accordance with illustrative embodiments of the present invention described herein with reference to FIGS. 2 through 10 can initiate a wireless E911 call in a wireless network as described in connection with FIG. 1. Briefly, the TCU can automatically place an E911 call (e.g., in response to an airbag deployment indication received from a vehicle sensor) and allow manual call placement by a user (e.g., by pressing cell phone keypad buttons, designated emergency services button provided by the vehicle head unit or TCU, or via voice activation). As will be described in connection with FIGS. 6a and 6b, the TCU comprises, or is coupled to, a GPS device, and a cellular modem or mobile transceiver or any other device known in the art to communicate with the wireless network.

Figure 8:
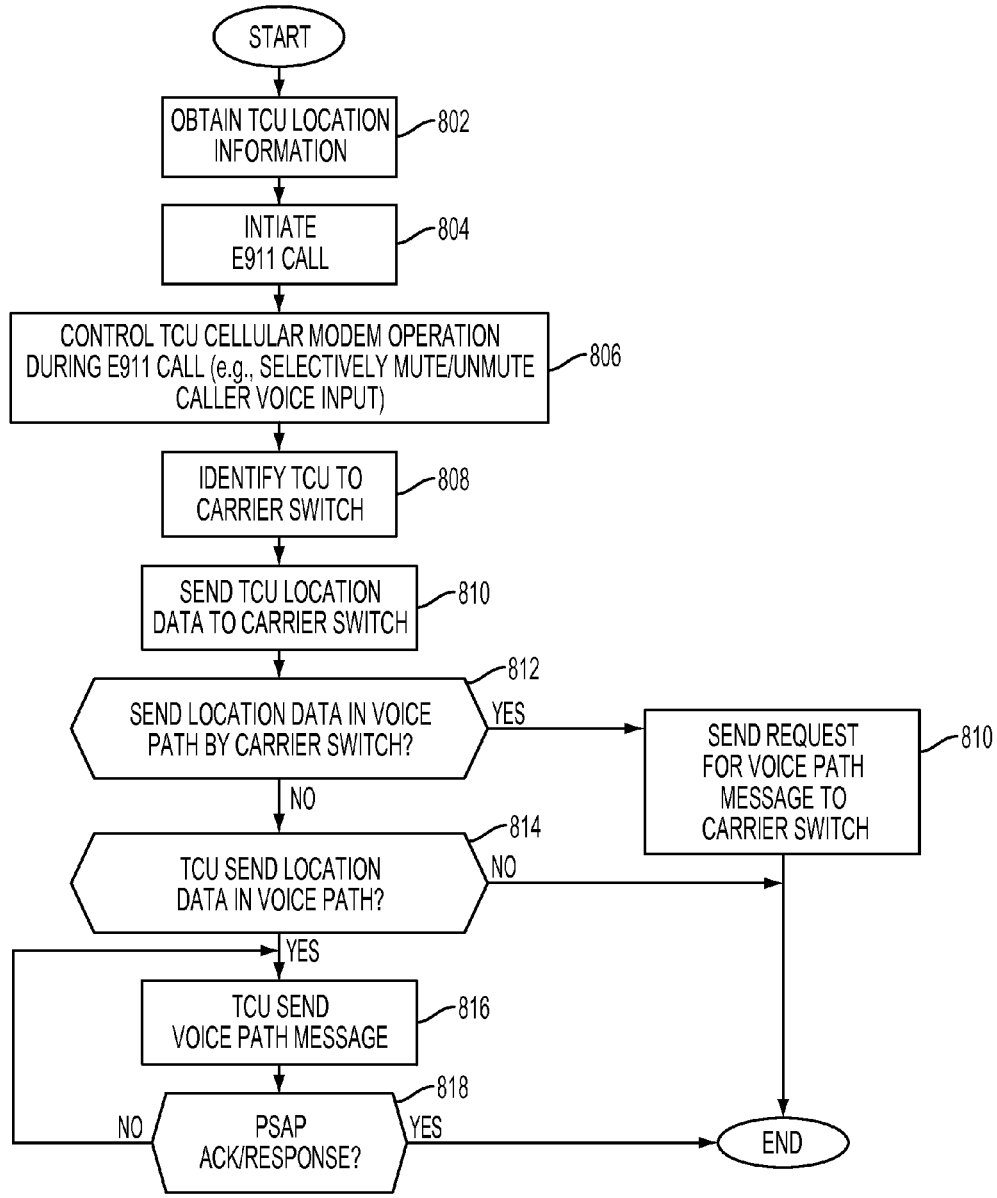
FIG. 8 is a flow chart illustrating operations performed by a TCU programmed or otherwise configured in accordance with an illustrative embodiment of the present invention.
Figure 9:
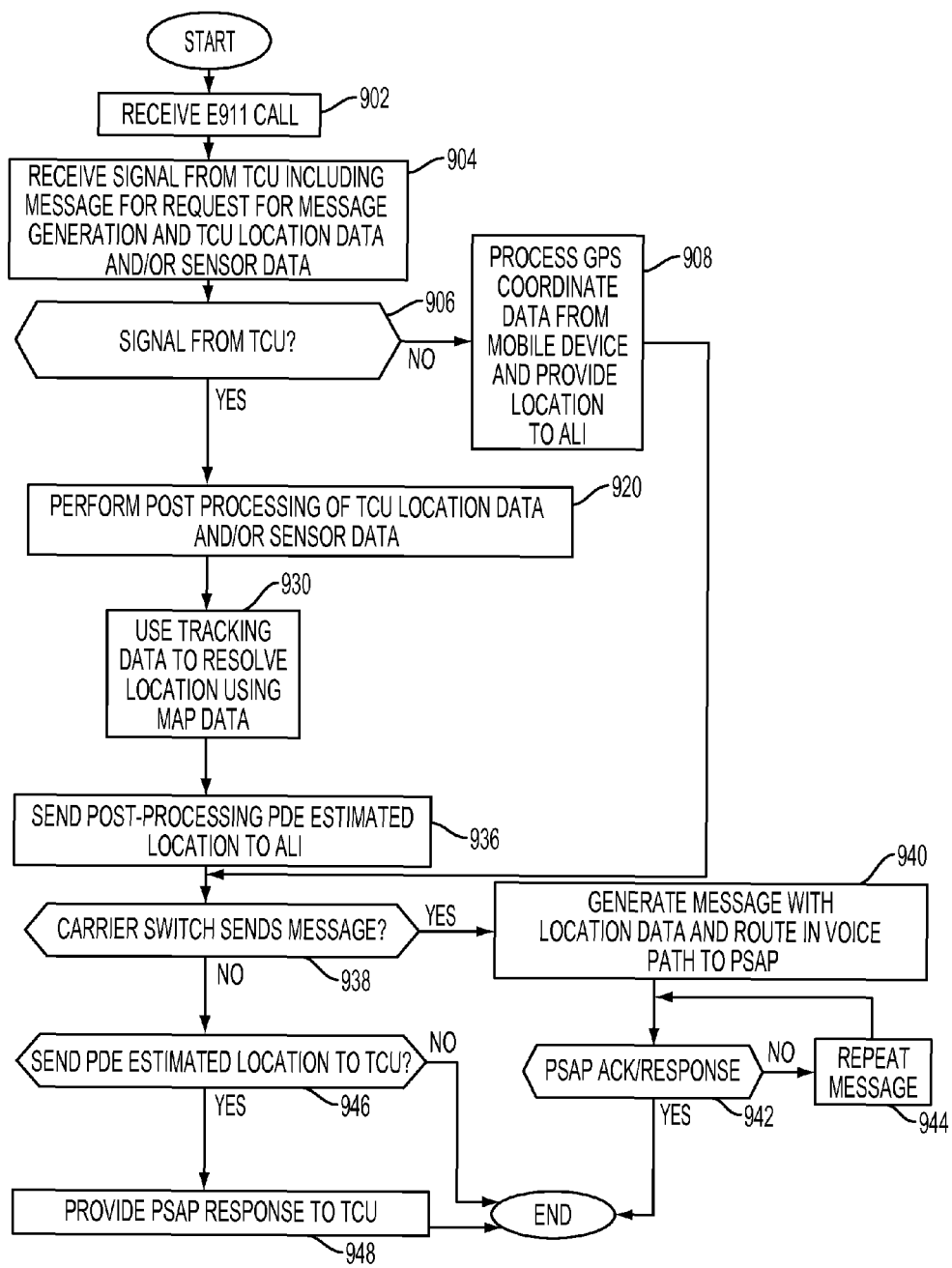
FIG. 9 is flow chart illustrating operations performed by a carrier switch (e.g., MSC) telematics device programmed or otherwise configured in accordance with an illustrative embodiment of the present invention.

In addition, the TCU can also be provided with dead reckoning software. Since about the year 2005, nearly all mobile devices transfer GPS coordinates and associated GPS signal quality metrics (e.g., signal strength) to an MSC 120 when a call is initiated and a link is established with one or more local cellular towers 110 (e.g., a Node B, a base station, etc.) of a wireless carrier network. FIGS. 5, 8 and 9 exemplify operations of a TCU, a MSC and associated PDE that are configured to combine TCU location data with network location data to make a determination of the caller's position (i.e., a conventional PDE estimated location) when the TCU does not employ dead reckoning, but to also, calculate an improved PDE estimated location when dead reckoning is available at the TCU and the TCU is configured to provide dead reckoning information (e.g., a series of coordinates determined to represent points along a path, vector or a trajectory of the TCU) to the MSC/PDE in accordance with an illustrative embodiment of the present invention.

The MPC 140 assigns an ESRK to the call using a conventional PDE estimated location, or using an improved PDE estimation based on dead reckoning information provided to the MSC/PDE by the TCU in accordance with an illustrative embodiment of the present invention. The MPC 140 transmits the ESRK, the PDE estimated location, and the mobile terminal callback number to a PSAP automatic location information (ALI) database 150 corresponding to the PSAP to which the call has been determined to be routed (e.g., by an E911 selective router). The ALI database 150 responds to the information by transmitting an acknowledgement (ACK) to the MPC 140. The MPC also transmits the ESRK to the carrier switch 120. After receiving the ESRK from the MPC 140, the carrier switch 120 routes the voice call and the ESRK to the appropriate PSAP through an E911 router 160 via a carrier trunk. In response to receiving the ESRK, the PSAP 170 receives the PDE estimated location via the wireless system data path by transmitting the ESRK to the PSAP ALI 150, which responds by transmitting the PDE estimated location and the callback number of the TCU to the PSAP 170.

As explained below, TCUs and/or the MSC can provide PDE estimated location information to a PSAP via the voice path in accordance with illustrative embodiments of the present invention. Even for TCUs that cannot provide dead reckoning data to the MSC, the PSAP can benefit from receiving conventional PDE estimated location forwarded by the MSC in the voice path as an audio message as described in FIG. 2, or by the TCU or MSC using TTY messages in the voice path as described in FIGS. 3A and 3B.

Voice Channel Messaging of TCU Location Coordinates to PSAPs

Figure 2:
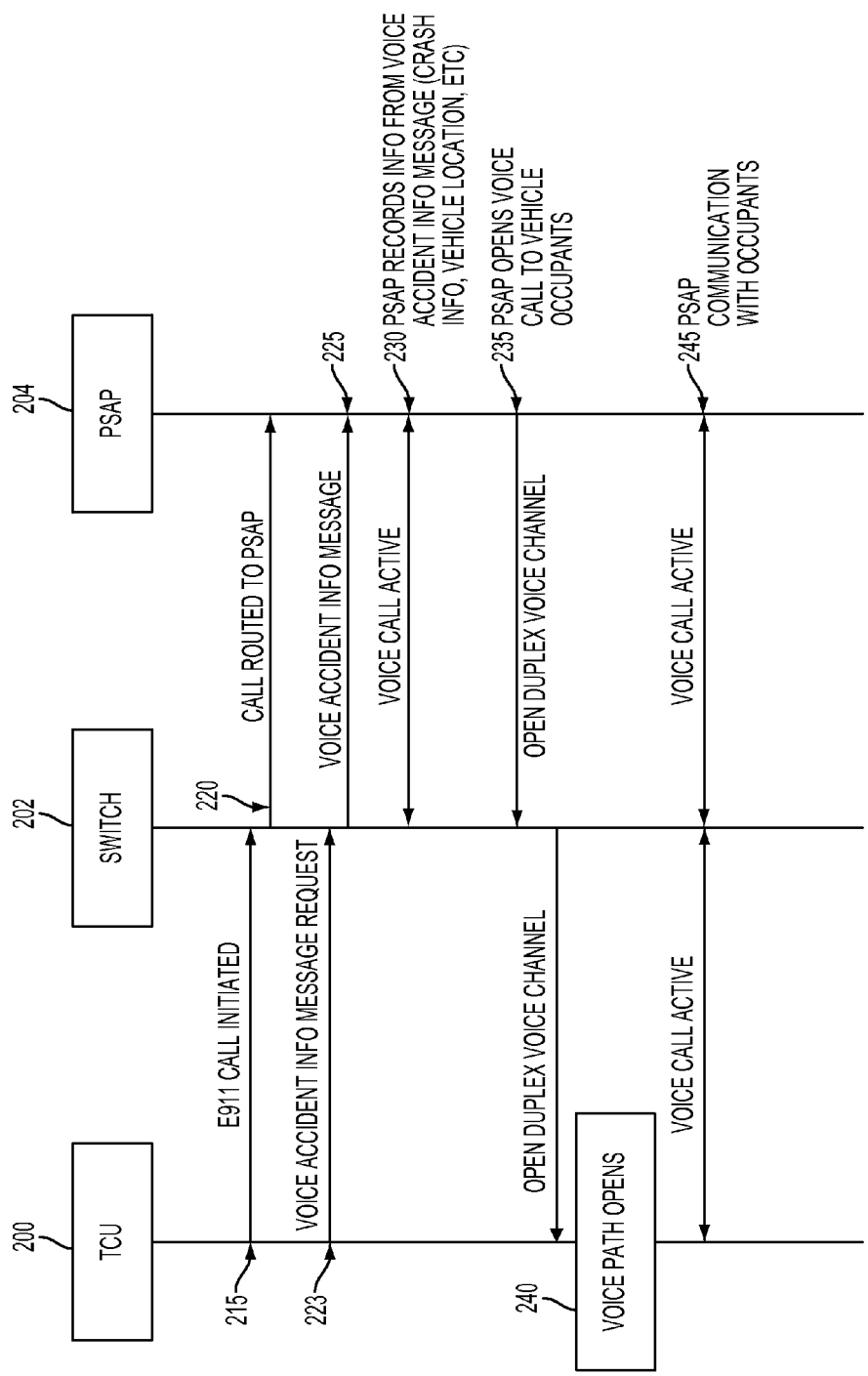
FIG. 2 depicts of a method of transmitting an audio message with TCU location coordinates to a PSAP in accordance with an illustrative embodiment of the present invention.
Figure 3A:
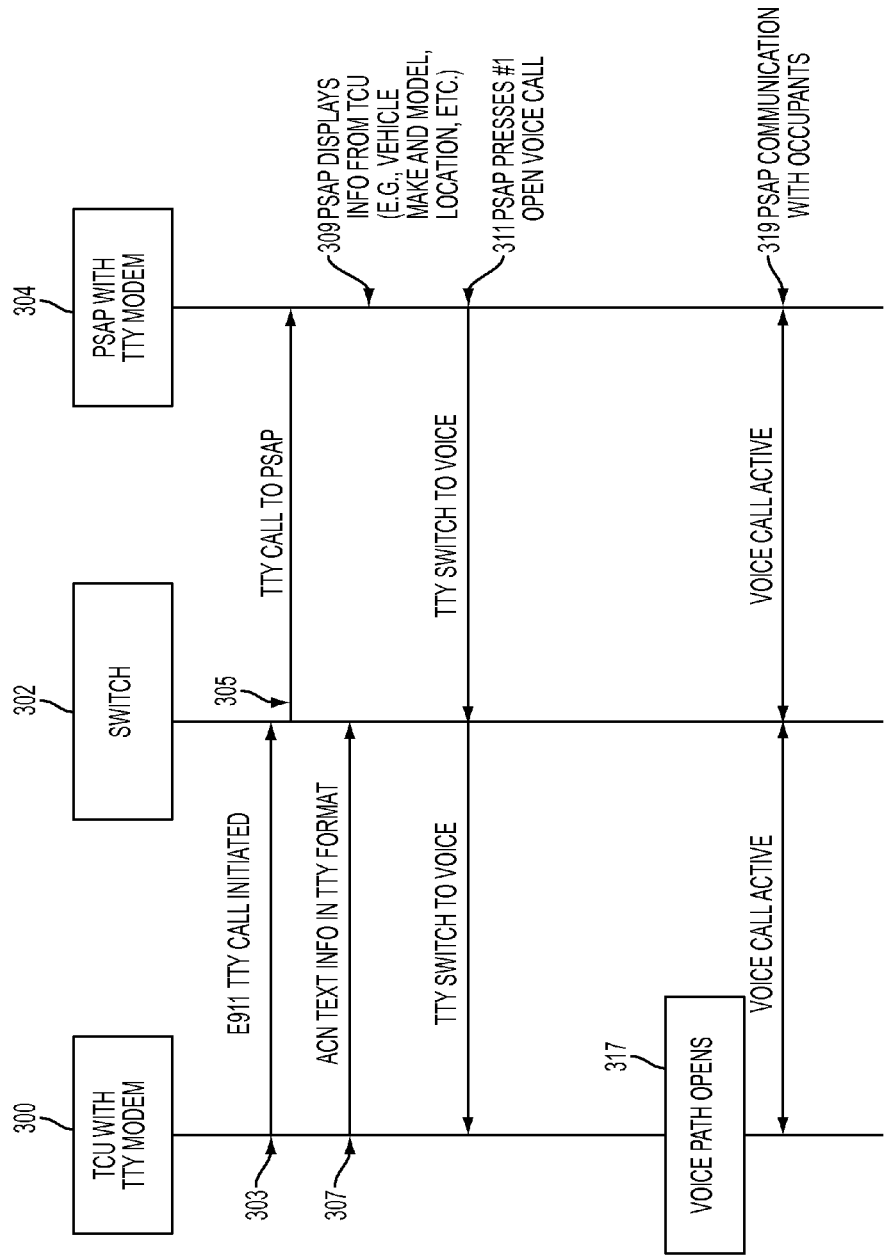
FIGS. 3A and 3B depict methods of transmitting a TTY-formatted message with TCU location coordinates to a PSAP in accordance with illustrative embodiments of the present invention.
Figure 3B:
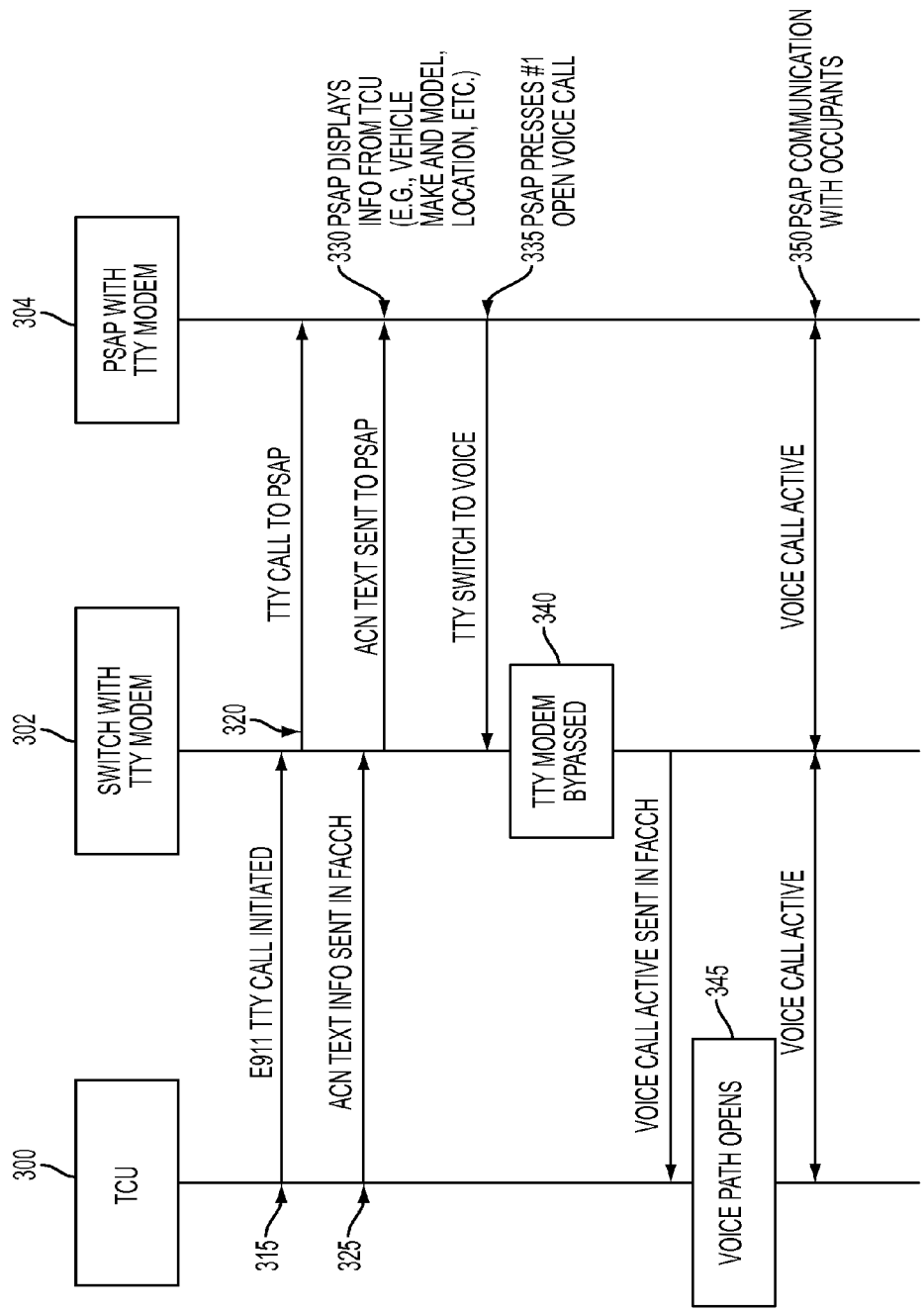

In accordance with aspects of illustrative embodiments of the present invention shown in FIGS. 2, 3A and 3B, either the TCU or the MSC (i.e., on behalf of a TCU) can generate automated messages (e.g., ACNs) that are provided directly to a PSAP via a voice path and that may comprise the more accurate location information (e.g., conventional PDE estimated location, or improved PDE estimated location generated in accordance with an embodiment of the present invention) obtained by the MSC 120 in conjunction with the PDE 130. It is to be understood that these voice path messages are in addition to the improved location information (e.g., PDE estimated locations sent to the PSAP via the ALI data path). As will be described below, sending these automated messages directly to a PSAP via a voice path ensures that all PSAPs receive improved TCU location data (e.g., GPS coordinates that are otherwise only provided via a data channel in cellular infrastructure, which can include coordinates of a conventional PDE estimated location or an improved PDE estimated location determined at the MSC with a PDE). Thus, it is to be understood that aspects of the illustrative embodiments of the present invention shown in FIGS. 2, 3A and 3B can be implemented using TCU GPS coordinates with or without dead reckoning data being provided by the TCU to the MSC and corresponding improved PDE location estimate determined at the MSC with a PDE.

FIG. 2 illustrates an example method of using automatically generated audio messages (e.g., pre-recorded audio messages) to report location information (e.g., at least GPS coordinates) for a TCU 200 to a PSAP 204 via a carrier switch 202 in an illustrative TSSS system. As noted, such automated message delivery via a voice path can be particularly helpful to PSAPs that may lack E911 Phase II capabilities and may not otherwise be able to receive caller location coordinates. For example, the TCU 200 and/or the carrier switch 202 are programmed or otherwise configured to perform the operations described in connection with FIG.

2, among other operations. For example, illustrative algorithms for the TCU 200 and the carrier switch (e.g., MSC 202) are described below in connection with FIGS. 8 and 9.

At 215, the TCU 200 detects an event that requires dispatch of emergency assistance and automatically initiates an E911 call. For example, the TCU 200 senses or receives signal(s) and/or message(s) indicating an airbag deployment in a vehicle (e.g., a collision, a roll, an accidental deployment, etc., sensed or determined by a sensor or other device and indicated to the TCU via a controller area network or CAN vehicle bus), thereby causing the TCU 200 to initiate an automatic collision notification (ACN) by initiating an E911 call. Alternatively, a vehicle occupant can initiate the call by dialing 9-1-1 or pressing a designated button via the cellular modem or handset or other user interface (e.g., vehicle head set, dashboard or steering wheel) or via voice activation supported by the cellular modem and vehicle electronics), for example. The carrier switch 202 receives the E911 call, and the call is routed to the PSAP 204 as indicated at 220. The TCU 200 can be programmed, for example, to send a request to the carrier switch 202 to generate a message as well as send TCU generated location information (e.g., GPS coordinates and related data from the GPS device (e.g., GPS receiver 610 in FIGS. 6A and 6B) coupled to the TCU 200, as indicated at 223. For example, the request can be transmitted in a logical or control data channel in a wireless system such as a fast associated control channel (FACCH) in a GSM wireless system or other control data channel. If available, the TCU generated location information can also include plural coordinates representing a trajectory or vector or path of travel by the TCU as estimated using TCU-based dead reckoning.

As indicated at 225 in FIG. 2, when a voice channel to the PSAP 204 is opened via the carrier switch 202, the carrier switch (e.g., MSC) 202 is configured to play one or more automatically generated audio messages. For example, the MSC 202 or associated device can be configured to store pre-recorded audio messages or segments of recorded speech (e.g., memory 1014 in FIG. 10) that can be synthesized into a message and into which location information such as the GPS information from the TCU 200 or estimated location from a PDE (e.g., PDE 130) can be synthesized or otherwise converted for incorporation into an audio message such as "A vehicle has crashed at the following coordinates: longitude XX.XXX and latitude YY.YYY. Emergency operator, press '1' at any time to speak with the vehicle occupants." It is to be understood that other pre-recorded or synthesized messages can be generated by the switch 202 (e.g., MSC) to automatically indicate, for example, that a roll was detected, or high speed before impact was detected, or head-on impact point was detected, based on sensor information provided by the TCU 200 to alert an operator to call for advance lifesaving support prior to obtaining a duplex voice communication channel to speak to vehicle occupants, who may or may not be in any condition to communicate with the operator verbally or otherwise. A message can also provide the call taker (e.g., PSAP operator) with instructions to press a particular key pad button (i.e., thereby generating a corresponding DTMF tone on the voice path) to repeat the message, or repeat the location information, among other actions.

As indicated at 230 in FIG. 2, the PSAP receives the voice accident information message via the active voice channel opened via the carrier switch 202. For example, an operator or other party at the PSAP 204 receives the voice accident information message and responds accordingly by recording received audio information (e.g., crash information, vehicle location) which can then be provided to emergency services personnel or other types of responders and service providers. That is, in one example, the operator notes the vehicle location information and, optionally, crash information (e.g., speed at impact, roll information, impact points information, crash severity information, etc.), in the message, and presses "1" to initiate a duplex voice channel call to the vehicle occupants as instructed in the message. In another example, an automated system at the PSAP records information in the voice accident information message such as crash information, vehicle location, vehicle occupants information, or any other pertinent information in the voice accident information message prior to delivering the voice message to the operator.

As noted above, in the event the operator of the PSAP 204 receives a voice accident information message, the operator can open a duplex voice channel by sending a DTMF "1" to the TCU 200 via the carrier switch 202 as indicated at 235. The TCU 200 can be programmed, for example, to control the receive (Rx) and transmit (Tx) audio of the cellular modem during the voice path call (e.g., mute Rx and Tx audio until the PSAP operator is ready to talk to the vehicle occupants), and await a DTMF response from the PSAP. The TCU is configured to respond to the received DTMF '1' tone by controlling the cellular modem to unmute the cellular modem Rx and Tx audio and allow the PSAP to communicate verbally with the vehicle occupants.

Thus, in the example of FIG. 2, the MSC 202 generates an audio message for automatically transmitting relevant information (e.g., comprising location coordinates) to the PSAP 204. The example of FIG. 2 provides a low cost, alternative approach to using commercial TSP call centers since it allows TSPs to offer an automated collision notification service that routes calls directly to the 911 operator. Further, as noted previously, not all PSAPs may have the capability to receive location coordinates from the cellular infrastructure (e.g., PSAPs lacking Phase II capabilities). In order to guarantee the crash information is relayed to these PSAPs, the information can be transferred in the voice path as shown in the illustrated embodiment described with reference to FIG. 2. The location information in the voice path message can be an improved PDF estimated location as described below in connection with FIGS. 4, 5A and 5B.

In accordance with illustrative embodiments of the present invention, FIGS. 3A and 3B illustrate example methods of using voice path data or text messages (e.g., Teletypewriter or TTY data signaling protocol or other data signaling protocol that is transmitted in a voice channel band) to report location information from a TCU 300 (or, alternatively, a PDE estimated location) to a PSAP 304 via a carrier switch 302 in an illustrative TSSS system wherein PSAPs comprise TTY equipment. For example, the TCU 300 and/or the carrier switch (e.g., MSC) 302 are programmed or otherwise configured to perform the operations described in connection with FIGS. 3A and/or 3B, among other operations.

In the example of FIG. 3A, the TCU 300 comprises a TTY modem or TDD that transmits TTY-formatted messages (e.g., or messages in any other TTY or TDD-compatible format) to a corresponding TTY modem or TDD at the PSAP 304 data via the carrier switch 302. PSAPs are generally required to support TTY/TDD to provide equal access to hearing and speech impaired individuals. The TTY/TDD equipment deployed by PSAPs is generally standardized to be in compliance with TIA/EIA-825, "A Frequency Shift Keyed Modem for Use on the Public Switched Telephone Network," promulgated by the Telecommunications Industry Association located in Arlington, Va., for example.

With continued reference to FIG. 3A, when the TCU 300 detects a crash or other condition to be reported to emergency personnel or other responders, the TCU 300 initiates an automatic collision notification (ACN) call by initiating an E911 call, as indicated at 303. Alternatively, a vehicle occupant can initiate an E911 call (e.g., in a situation where a crash is not detected, but a vehicle occupant requires emergency services such as for a medical condition) by dialing 9-1-1 or pressing a designated button via the cellular modem or handset or other user interface, for example. The TCU can be configured to override the caller's ability to initiate a manual call during an automatically initiated E911 call until the automatically initiated E911 call is terminated. The carrier switch 302 receives the E911 call and routes the E911 call to the PSAP 304, as indicated at 305.

When the voice channel to the PSAP 304 is opened, the TCU 300 sends one or more text messages in, for example, TTY format, such as "A vehicle has crashed at the following coordinates, Longitude XX.XXX, Latitude YY.YYY. Emergency operator, please press '1' at any time to speak with vehicle occupants". It is to be understood that the text message can comprise information besides location such as, but not limited to, vehicle make and model, crash severity, impact point information, vehicle occupant information, roll sensor information, and so on. A message can also provide the call taker (e.g., PSAP operator) with instructions to press a particular key pad button (i.e., thereby generating a corresponding DTMF tone on the voice path) to repeat the message, or repeat the location information, among other actions. The TCU 300 can be configured, for example, to generate an automated collision notification or accident information message that comprises predetermined text into which vehicle sensor or position information is inserted. As stated above, the coordinates can be provided via TCU GPS data, or GPS assist technology or dead reckoning, and processed via a PDE 130 at a carrier switch 120, for example. The PDE determines a conventional PDE estimated location based on GPS data available from the mobile device, or determines improved PDE estimated location if the TCU provides the MSC/PDE with dead reckoning tracking information, and either type of estimated location can be provided to the TCU in accordance with an embodiment of the invention to generate a voice channel message.

The TTY modem or TDD collocated with the PSAP 304 automatically receives and extracts the TTY modem signaling protocol or equivalent thereof, and displays the corresponding text on the TTY Monitor as indicated at 309. The TCU 300 can repeat the text message multiple times to ensure that the full message is available on the TTY modem and display or at least until the emergency operator presses "1" to speak with the vehicle occupants, for example. The TCU 300 can be programmed, for example, to control the cellular modem in the vehicle to selectively mute and unmute the Rx audio and Tx audio of the voice channel with respect to the vehicle occupants, and await a DTMF response, for example, from the PSAP to determine when to mute/unmute, play a message, and so on.

TTY communications between a TCU and a PSAP over a wireless channel, however, may be unreliable due to distortions from the digital audio encode and decode processes, as well as impairments or interruptions in the wireless channel. While approaches for reducing audio codec distortion for TTY signaling have been developed, impairments in the wireless channel may still reduce reliability of delivering the message.

In accordance with another illustrative embodiment of the present invention shown in FIG. 3B, a more reliable, alternative approach of delivering the TTY message over the wireless channel is provided by integrating the TTY modem with the carrier switch 302 instead of the TCU 300. As will be described in connection with FIG. 3B, the TCU 300 initiates a call in TTY mode with the carrier switch 302 and transmits the text to be transferred in a logical or control data channel in a wireless system such as a fast associated control channel (FACCH) in a GSM wireless system or other control data channel, for example. The control data channel can ensure reliable text transfer between the TCU and the carrier switch 302 through message acknowledgements. The carrier switch routes the TTY call to the PSAP 304 using the TTY modem at the carrier switch. This eliminates reliability issues introduced by routing TTY signaling through vocoders over wireless channels subject to interference.

In the example of FIG. 3B, when the TCU 300 associated with a vehicle detects or otherwise receives information indicating an event that requires dispatch of emergency assistance, the TCU automatically initiates an E911 call via TTY using ACN text. For example, in the event that the TCU 300 associated with a vehicle experiences an airbag deployment (e.g., a collision, a roll, an accidental deployment, etc.), the TCU 300 generates an ACN text message with information about the relevant event and initiates an E911 call using TTY or equivalent protocol (e.g., for sending data in the voice band such as substitution of data frames for speech frames) at 315. For example, the TCU 300 transmits an ACN text message via a data channel to a carrier switch 302 that includes a suitable TTY modem for communication with a TTY modem or TDD at the PSAP 304.

In the example of FIG. 3B, the ACN text message is transmitted in the forward access control channel (FACCH). An example ACN text message may state "A vehicle has crashed at the following coordinates: longitude XX.XXX and latitude YY.YYY. Emergency operator, press '1' at any time to speak with the vehicle occupants." In another example, the ACN text message includes other relevant information for the operator at the PSAP 304 to consider (e.g., collision speed, roll information, estimate PDE location, GPS location, etc.) or instructions to the call taker as mentioned above in connection with FIG. 3A. Further, at 325, the TCU continues to transmit the ACN text in the FACCH or other control channel to the carrier switch 302 until it receives an appropriate response to the emergency dispatch request from the PSAP.

As indicated at 320 of FIG. 3B, the carrier switch 302 generates a TTY call with the ACN text message to the appropriate PSAP 304. The PSAP receives the ACN text message at 330 and displays the ACN text message on a terminal display associated with the TTY modem or TDD at the PSAP. In the example of FIG. 3B at 335, the operator of the TTY modem terminal at the PSAP 304 presses "1" to open a voice call. The carrier switch can be programmed, for example, to respond to a designated DTMF tone from the PSAP that indicates a PSAP request to switch to voice and open the voice call to vehicle occupants. For example, when the designated PSAP input (e.g., DTMF tone) is received, the carrier switch 302 transmits a switch-to-voice command to the TCU 300 on a data or control channel (e.g., FACCH, etc.), effectively bypassing the TTY modem of the carrier switch 302. At 345 of FIG. 3B, the TCU 300 is programmed to receive the voice call active request from the PSAP in the FAACH, and is configured to control the cellular modem to open a voice communication channel with the PSAP 304 (e.g., unmute the Rx and Tx audio and, at 350, allow verbal communication between an operator of the PSAP 304 and the occupants of the vehicle associated with the TCU 300. It is to be understood that other methods can be used to open a bi-directional communication channel between the PSAP and the vehicle occupants.

Thus, because the ACN text message is sent via data channels between the TCU and the carrier switch in the example of FIG. 3B, reliability issues introduced by routing TTY signaling using vocoders over wireless channels subject to interference are reduced. Further, because the ACN text message is sent via data channels, additional steps such as error detection can be used to verify the reliability of the data sent from the TCU.

Improvements in TCU Location Information Provided to Responders

As noted above, TCU GPS coordinates can be inaccurate or even unavailable to a PDE; in which case, the PDE employs network-based positioning determination (e.g., triangulation) which can also be inaccurate. Further, as noted above, TCU GPS information with GPS assist and/or dead reckoning can also be inaccurate without comparison to a map database. Such databases, however, can be prohibitively expensive maintain and operate in every TCU or at a commercial call center.

Figure 4:
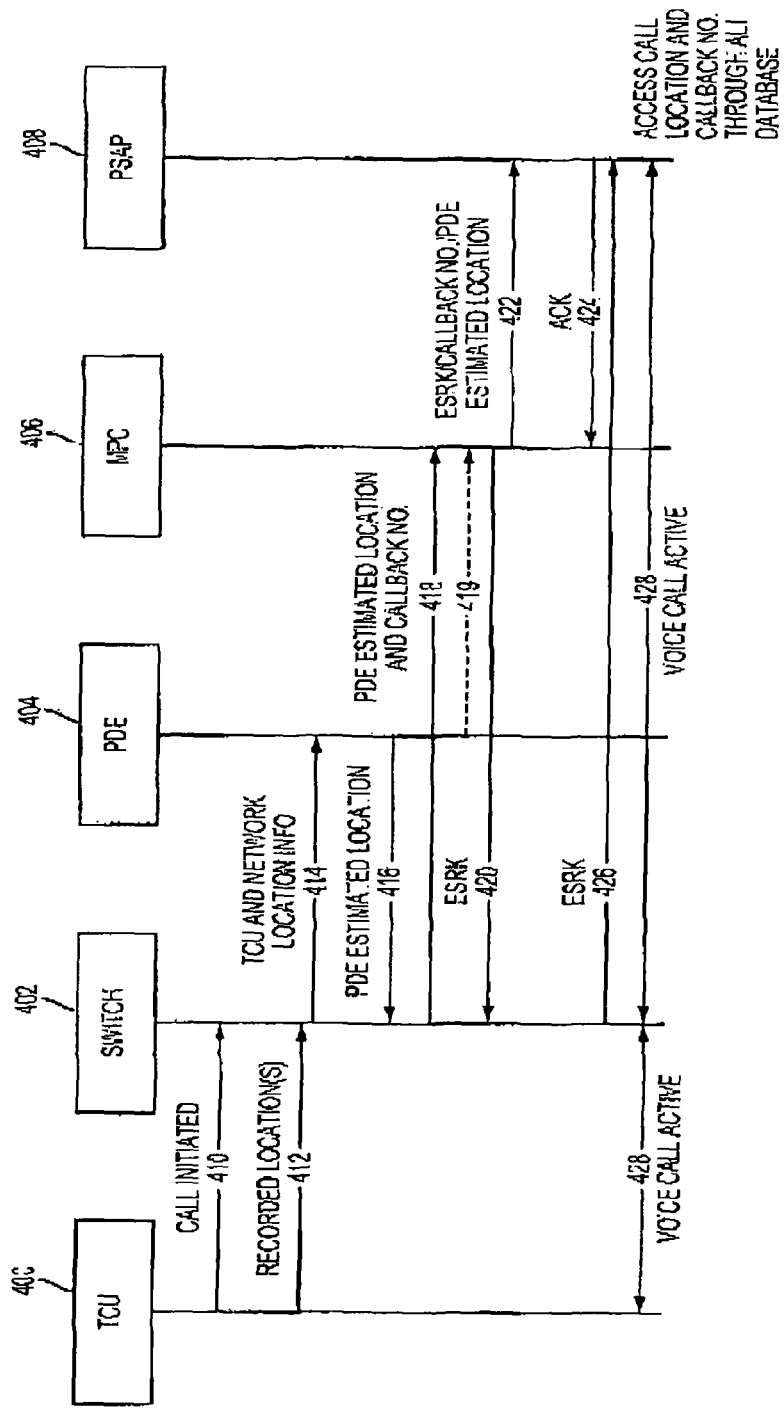
FIG. 4 shows a method of improving location estimation and reducing risk of conflicting location information at PSAPS in accordance with an illustrative embodiment of the present invention.
Figure 10:
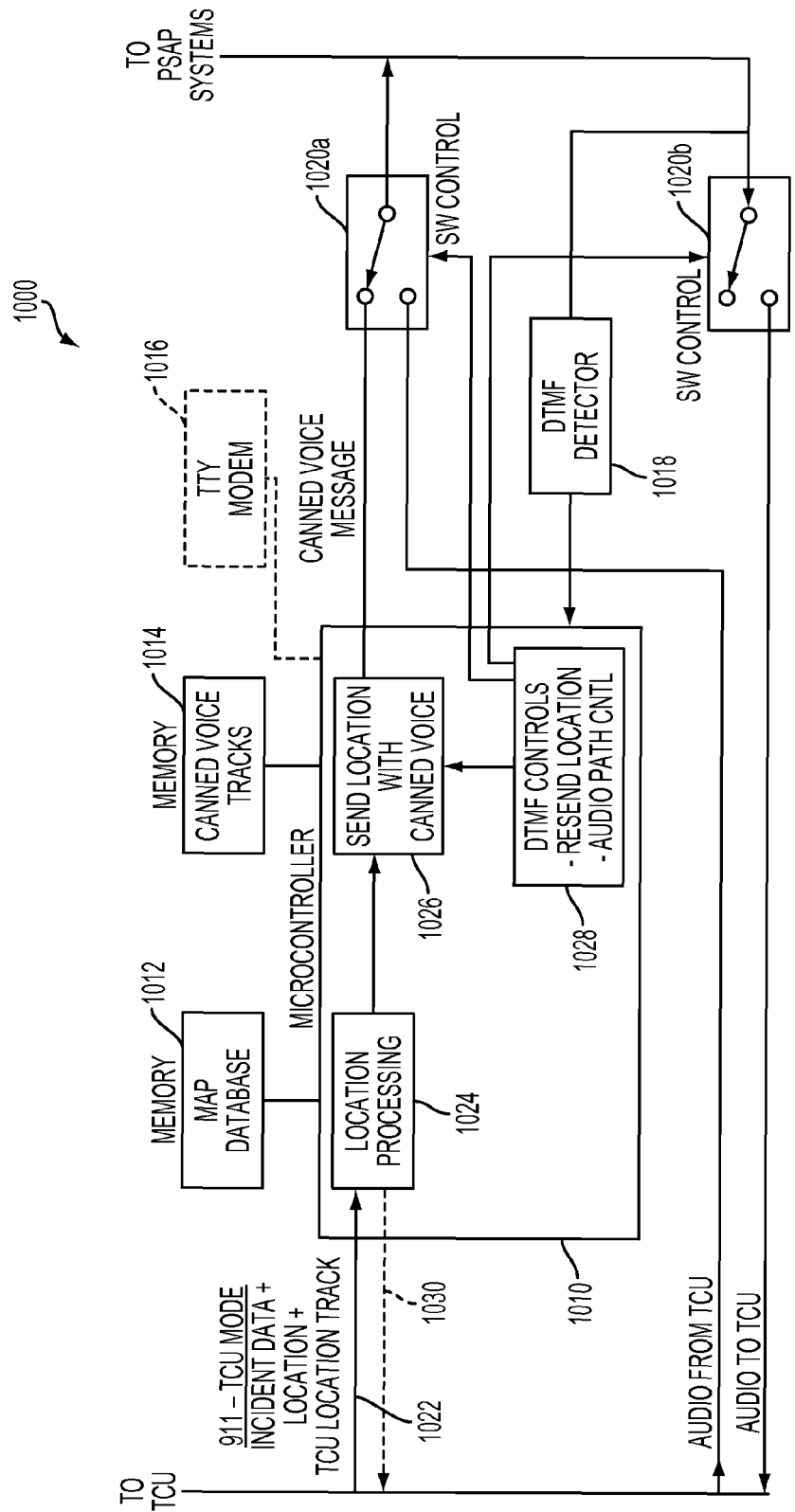
FIG. 10 depicts a carrier switch (e.g., MSC) telematics device configured to generate voice path messages to PSAPs to provide TCU location information or PDE estimated location information and optionally other information about the incident requiring an emergency services response in accordance with an illustrative embodiment of the present invention.

In accordance with an illustrative embodiment of the present invention, a method is provided to improve accuracy of TCU location information by integrating TCU dead reckoning data with the carrier's PDE function for the final TCU location determination (e.g., the TCU location coordinates provided to the ALI database via the wireless network data path and optionally provided to a PSAP in the voice path). In the example of FIG. 4, one or more of the TCU 400, the carrier switch 402 and/or the PDE 404 are programmed or otherwise configured to perform the operations described in connection with FIG. 4, among other operations. For example, illustrative algorithms for a TCU (e.g., a TCU 600, 600') and a carrier switch 400 and related PDE 404 (e.g., a MSC telematics device 1000) as shown in FIG. 10) are described in connection with FIGS. 8 and 9.

With reference to 410 in FIG. 4, a vehicle or other device associated with the TCU 400 experiences an event, for example, that causes the TCU to initiate an emergency call (e.g., vehicle sensor input received by a TCU or manual 9-1-1 dialing by a vehicle occupant). Since not all TCU's may have dead reckoning data to provide the MSC/PDE, the TCUs with dead reckoning data can initiate a call to the MSC carrier switch 402 with a flag or data field set indicating that the call type is a TCU emergency call with enhanced TCU location information, as indicated at 410. The carrier switch 402, in turn, receives the call and detects the flag or data field set (e.g., a field in a control channel message, etc.) indicating special handling of the received call such as extract process the dead reckoning from the TCU GPS data provided when the call was established, for example. In another example, the TCU callback number can be assigned by the carrier to falls within a preset range of TCU numbers to indicate that special handling (e.g., post-processing of TCU location data comprising dead reckoning for improved PDE estimated location determination) is needed apart from the conventional PDE estimated location determinations.

Along with the emergency call request, the TCU 400 can also be programmed or otherwise configured to send its last recorded location and optionally a predetermined number of historical recorded locations or series of position coordinates representing tracking locations along a vector or path determined via dead reckoning, as indicated at 412, to enable reconstruction of the vehicle track leading to the accident or event requiring emergency services. The carrier switch 402 then transmits the TCU location information to an integrated, or separate but connected, PDE 404, as indicated at 414, for position post-processing to determine the location of the TCU 400. The position processing can involve processing the location information from the TCU with a map database (e.g., when dead reckoning tracking information is available, or can incorporate network location information in its algorithm to determine a weighted location estimate for the TCU if TCU GPS data is insufficient and no dead reckoning information is available from the TCU, as described below in connection with FIGS. 8 and 9. The PDE 404's estimated location is then returned to the carrier switch 402 as indicated at 416. As described in connection with FIG. 1, the carrier switch 402 then forwards the final PDE estimated location to the MPC 405 along with the callback number, for example, as indicated at 418. The MPC 406 may optionally receive the location information directly from the PDE 404 using a separate data path as indicated at 419.

Once the MPC 406 receives the PDE estimated location, it assigns an ESRK to the call. At 420, the ESRK is sent to the carrier switch 402. In FIG. 4, at 422, the MPC 406 also transmits the ESRK, the callback number of the TCU 400, and the PDE estimated location to the PSAP system for storage (e.g., for storage in a ALI database corresponding to PSAP 408), where the ESRK may be later used by the selected PSAP to access the callback number and location information. In the example of FIG. 5, the PSAP 408 responds with an Acknowledgement (ACK) message at 424 when the message is received from the MPC 406.

In response to receiving the ESRK at 420, the carrier switch 402 routes the voice call and the ESRK to the selected PSAP 408 via an E911 selective router at 426. In the event the PSAP 408 has Phase II capabilities, the PSAP answering the call (indicated here as PSAP 408) uses the ESRK to retrieve the callback number of the TCU 400 and caller's location (e.g., the PDE estimated location) stored in the ALI. After the PSAP 408 retrieves the callback number of the TCU 400 and the PDE estimated location, a voice channel can be opened, at 428, to the 911 caller, and the caller's phone number and location estimate can be displayed on a PSAP operator's terminal (e.g., ALI monitor).

As noted above in the background section, TCU location estimates performed by the TCU can be inaccurate when GPS signals are weak, for example, or when TCU-based GPS assist technology or dead reckoning is subject to errors (e.g., distance or direction errors). Further, it can be prohibitively expensive to integrate a map database in the TCU, or employ a call center, to mitigate these TCU estimated location errors. The illustrative embodiment depicted in FIG. 4 is advantageous because the carrier switch (e.g., MSC 402 in conjunction with a PDE 404) can perform post-processing of dead reckoning information received from the TCU and to provide a more accurate location estimate of the TCU. Thus, in such illustrative embodiments, PSAP services dispatch operations are better supported.

In accordance with illustrative embodiments of the present invention, two alternative approaches are described below in connection with FIGS. 5A and 5B to provide the improved PDE estimated location to the PSAPs in the voice path (e.g., by generating of an audio information message in similar manner as shown in the example of FIG. 2, or TTY-formatted messages as described in the example of FIGS. 3A and 3B). Briefly, in a first approach illustrated in FIG. 5A, the carrier switch 502 transfers the final PDE estimated location back to the TCU 500 in a data channel, while it routes the voice call to the PSAP 504. When the call is connected, the TCU 500 uses the PDE estimated location received from the carrier switch in the canned voice message to the PSAP 504. This approach provides the PSAP with the best location estimate provided by the PDE 506 and ensures the location provided by the canned voice message corresponds to (e.g., matches) the location provided by the ALI database. In a second approach, the canned voice audio generator is located at the carrier switch 502. In this approach, the TCU 500 provides the carrier switch 502 with information on the event being reported (e.g., a vehicle accident), along with the location information in a fast access data channel or control data channel when the call is initiated. Once the voice connection with the PSAP 504 is established, the carrier switch 502 is programmed or otherwise configured to generate a canned voice audio message(s) to provide the PSAP 504 with audio information on the vehicle crash including the PDE estimated location, and open the line to the vehicle occupants when the appropriate response (e.g., a DTMF tone designated in the audio message) is received from the PSAP.

For example, the TCU 500 and/or the carrier switch 502 are programmed or otherwise configured to perform the operations described in connection with FIGS. 5A and 5B, among other operations. Illustrative operations of a TCU and carrier switch and an associated PDE are also described below in connection with FIGS. 8 and 9. In FIG. 5A at 510, a vehicle sensor associated with the TCU 500 detects or otherwise receives information indicating an event that causes the TCU 500 to initiate an emergency call. Alternatively, a vehicle occupant can manually enter 9-1-1 by touch pad or voice activation at the cellular modem, handset or other user interface. As stated above, the TCU can be configured to override the caller's ability to initiate a manual call during an automatically initiated E911 call until the automatically initiated E911 call is terminated. In one example, the TCU 500 initiates a call to mobile switching center (MSC) carrier switch 502 with a flag or data field set indicating the call type is a TCU emergency call with dead reckoning data. The carrier switch 502 receives the call and detects a flag or data field set (e.g., a field in a control channel message, or TCU phone number within a preset range, etc.) indicating that special handling of the received call is needed (e.g., post-processing of TCU location data with dead reckoning information for improved PDE estimated location determination).

Along with the emergency call request, the TCU 500 can be programmed or otherwise configured to send its last recorded location and optionally a predetermined number of historical recorded locations or series of position coordinates representing tracking locations along a vector or path determined via dead reckoning, as indicated at 512 (e.g., via an audio message with audio synthesized location data from a GPS receiver, or with encoded data, or a TTY-formatted message as described above with FIG. 3A). The carrier switch 502 then transmits the TCU location information to an integrated, or separate but connected, PDE 506, as indicated at 514, for post-processing to determine the location of the TCU 500. The PDE estimated location is sent to the carrier switch 502, as indicated at 516, and then to the TCU as indicated at 518.

In response to receiving the PDE estimated location at 518, the TCU 500 generates an accident information message based on the PDE estimated location and transmits the accident information message over the voice path as indicated at 520. This approach provides the PSAP 504 with an optimal location estimate provided by the PDE and ensures the location information provided to the PSAP 504 by the voice path message matches the location provided by the ALI database. For example, the TCU 500 transmits a canned audio message such as "A vehicle has crashed at the following coordinate: longitude XX.XXX and latitude YY.YYY. Emergency operator, press '1' at any time to speak with the vehicle occupants," wherein the coordinates of the PDE estimated location are provided via audio synthesized digital data obtained from the PDE at step 518. As illustrated in the example of FIG. 5A, the TCU 500 can retransmit the voice accident information message, as indicated at 522 if there is no response or until an emergency dispatch service contacts the TCU 200.

Figure 5A:
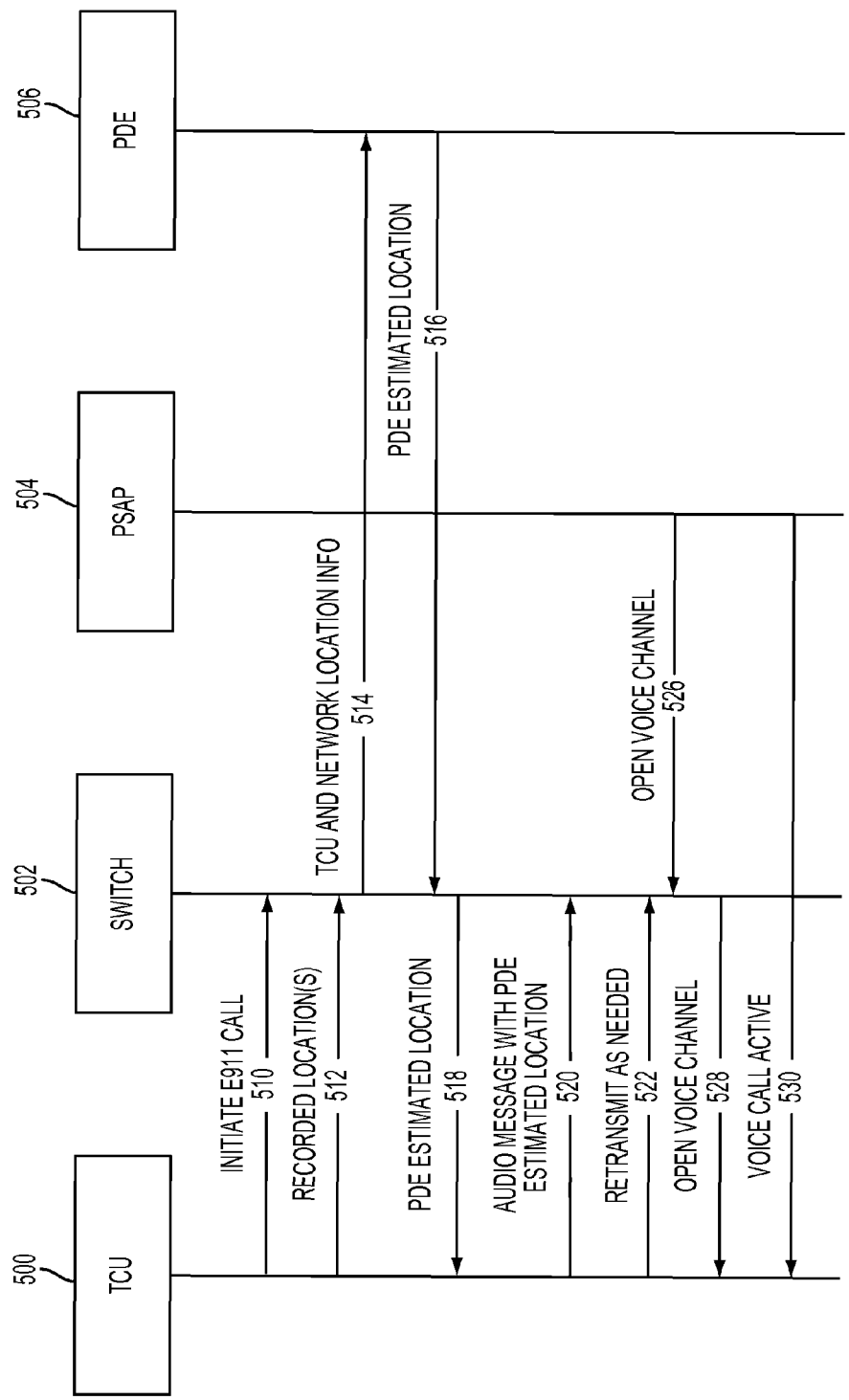
FIGS. 5A and 5B show methods of incorporating improved PDE estimated location information into messages transmitted to PSAPs from a TCU and a carrier switch, respectively, in accordance with illustrative embodiments of the present invention.

In the example of FIG. 5A, once the carrier switch 502 receives the voice path accident information message, the E911 call is routed to the appropriate PSAP 504 as indicated at 524. At the PSAP 504, an operator receives the voice path accident information message and responds accordingly by recording the received audio information for providing to emergency dispatch services. That is, in one example, the operator notes the information in the message, and presses "1" to open the voice channel as instructed by the audio message. For example, as stated above, the TCU can control the cell modem and can selectively mute/unmute the Rx and Tx audio of the cell modem audio and control other operations. When the PSAP operator responds by pressing "1" during the message or other DTMF tone or input designated in the audio message received at the PSAP, the TCU is programmed to open the voice channel for verbal communication between the vehicle occupants and the PSAP 504 as indicated at 526. Thus, as indicated at 530, the operator at the PSAP 504 can participate in a voice call with the occupants of the vehicle associated with the TCU 500.

Figure 5B:
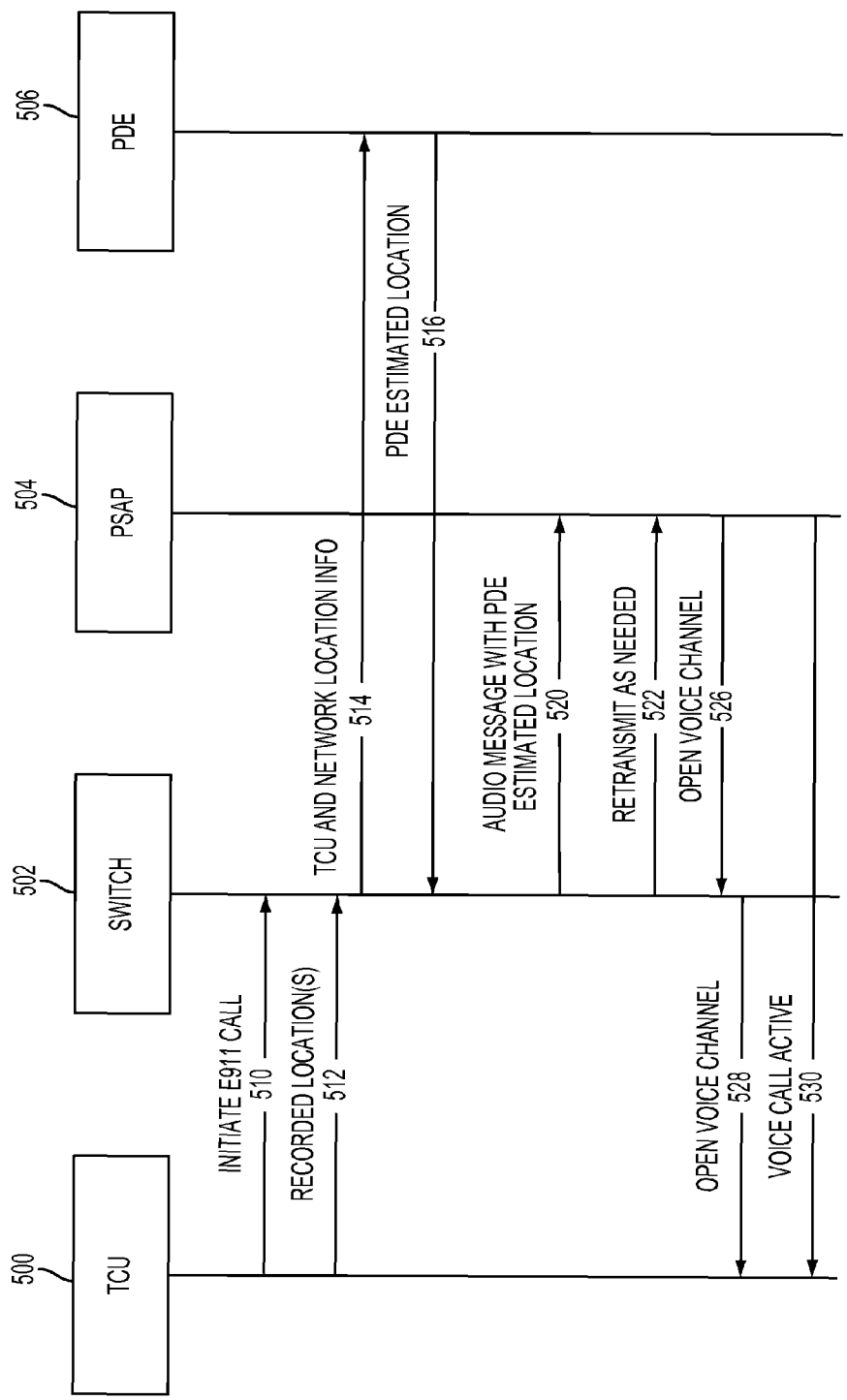

In another example of FIG. 5B, the carrier switch 502 may generate the voice path accident information message based on the PDE estimated location rather than the TCU as described above. In this approach, the TCU 500 provides the carrier switch 502 with information on the event being reported (e.g., vehicle accident), along with the location information, in a logical or control data channel when the call is initiated, for example. Once the voice connection with the PSAP is established, an accident information message can be generated at the carrier switch 502 to provide the PSAP 504 with audio information on the vehicle crash, including the PDE estimated location, as indicated at 520 and re-transmitted as needed, as indicated at 522. When the appropriate response is received from the PSAP (e.g., a DTMF tone returned to the carrier switch on the voice channel), as indicated at 526, the TCU can be configured to respond to the DTMF response by communicating with the PSAP operator via an open voice channel (e.g. the TCU can unmute the Rx and Tx audio of the cellular modem).

In the event the telematics service of FIGS. 5A and 5B transfers accident information to the PSAP 504 via TTY, for example, the carrier switch 502 may transfer the PDE estimated location (i.e., as opposed to the TCU's location estimate) to the PSAP 504 in the TTY format or other compatible TTY or TDD format. In another example, the carrier switch 502 queries the selected PSAP 504 and determines if the PSAP 504 supports TTY, and transmits the PDE estimated location in TTY format if supported, or with a generated audio message as described above if the PSAP 504 does not support the TTY mode. Further, in yet another example, the carrier switch 502 can transmit a message to the TCU 500 indicating the selected PSAP 504, and the TCU 500 then determines to transmit in either the generated canned audio message or using the TTY mode depending on the capability of the selected PSAP indicated in the message.

The provision of TSSS functions at the carrier switch 502 such as improved PDE estimated location determination (e.g., as described in FIG. 9 in accordance with illustrative embodiments of the present invention) allows more accurate and reliable automated accident information to be transferred from the TCU to the PSAP in a direct 911 call (e.g., when the PDE estimated location is provided to the TCU or otherwise provided to the PSAP by a generated message from the carrier switch). In addition, the accident location information provided to the PSAP by the ALI database more closely matches the location information delivered to the PSAP by the voice path for better accuracy when dispatching emergency services.

Figure 6A:
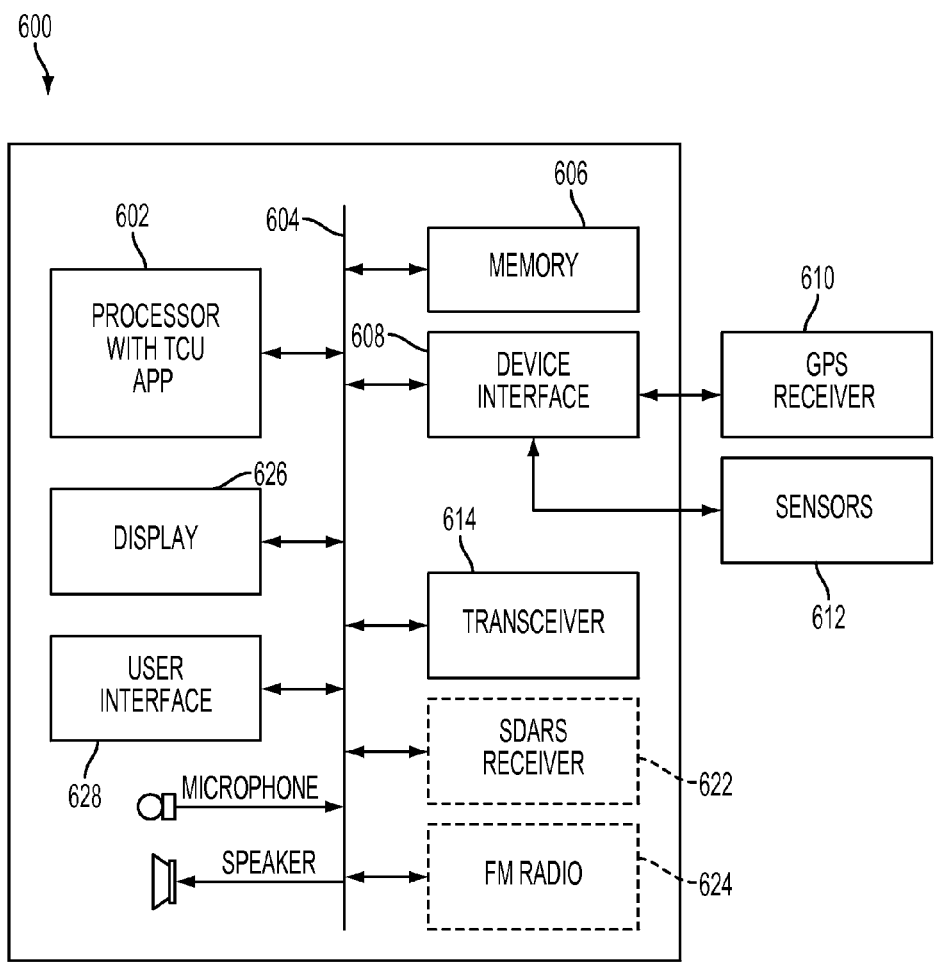
FIGS. 6A and 6B depict TCUs configured in accordance with illustrative embodiments of the present invention.
Figure 6B:
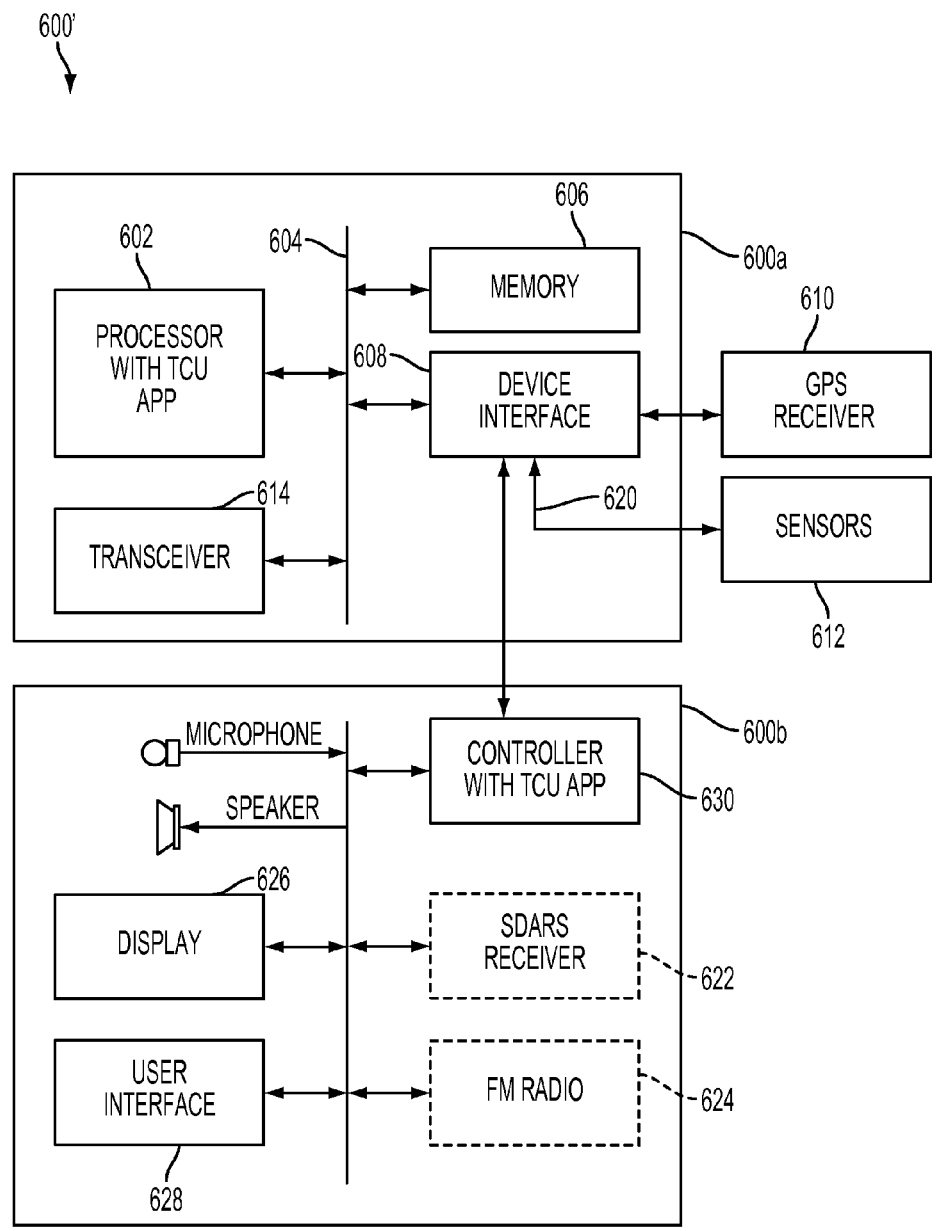

FIGS. 6A and 6B are block diagrams of illustrative embodiments of a TCU 600 and 600', respectively, deployed in a vehicle for implementing one or more TSSS operations described above in accordance with illustrative embodiments of the present invention. Other types of TCUs that are not deployed in vehicles are described below such as TCU's provided as mobile apps in mobile phones, personal data assistants or other portable computing devices that can also be coupled to sensors for detecting caller conditions (e.g., a mobile computing device with wireless connectivity to make E911 calls and coupled to or integrated with a medical device sensor).

For example, the TCU 600 shown in FIG. 6A can be embedded in a vehicle head unit, and include a display 626, user interface 628 (e.g., mechanical buttons or dials or graphical user interface selections), and radio receiver(s) (e.g., an SDARS receiver 622 and/or an AM/FM receiver 624) as well as a transceiver 614 (e.g., a cellular modem), among other components described below. Alternatively, the TCU 600' can be tethered, that is, a TCU application 630 can be provided in the head unit 600b, along with the display 626, user interface 628 and radio receiver(s) 622 and/or 624; however, the TCU processor 602, transceiver 614 (e.g., a cellular modem), GPS receiver 610 and related devices can be placed in a remote unit 600a located apart from the head unit 600b (e.g., under the driver's seat and connected to the head unit via a USB cable or wirelessly), as shown in FIG. 6B. The tethered configuration of FIG. 6B can be advantageous because the remote unit 600a is less likely to be destroyed in a vehicle collision than the head unit 600b. The TCU 600, 600' has one or more antenna(e) (not shown) for cellular or radio reception, for example.

The TCU can also be configured to operate without a dedicated cellular modem (e.g., transceiver 614) but rather in conjunction with a user' mobile phone (e.g., via a Bluetooth® radio connection like the Ford SYCH™ unit). Alternatively, the TCU can have a form factor other than an in-dash or factory-installed head unit such as in a rearview mirror configuration. For example, the TCU 600 can have a form factor similar to the OnStar For My Vehicle (FMV) unit for the rearview mirror (e.g., coupled to vehicle sensors and a cellular transceiver to make E911 calls and play automated messages), except the TCU's automated connectivity can be directly to an E911 access point, as described above, as well as to, or in place of, a commercial call center like that of OnStar Corporation, for example.

With continued reference to FIGS. 6A and 6B, the TCU 600 comprises a processor 602 that performs general logic and/or mathematical instructions (e.g., hardware instructions such as reduced instruction set computing (RISC), complex instruction set computing (CISC), very long instruction word (VLIW), etc.) to interface with and/or control devices such as the radio receivers 622, 624, user devices 626 and 628, GPS receiver 610 and the transceiver 614 (e.g., cellular modem). The processor 602 performs a TCU application (e.g., a modified mobile telephone operating system application) to implement one or more TSSS processes such as those described in connection with FIGS. 2 through 5 and 8 and 9. The processor 602 with TCU application can, for example, can leverage the vehicle bus (e.g., to obtain and use vehicle data such as acceleration, brake speed, and other conditions), as well as leverage the cellular modem 614 for IP data (e.g., audio streaming) and data applications (e.g., weather on the web and points-of-interest applications) in addition to TSSS operations.

The processor 602 in conjunction with the memory 606 can be provided with commercially available software for performing dead reckoning using data received from the GPS receiver 610 and from the sensors 612 (e.g., via the vehicle bus). Such dead reckoning software is available from different OEMs and automotive Tier 1 suppliers. Alternatively, the dead reckoning software can be provided in a GPS device or in a module separate from the processor 602 and GPS receiver 610.

The processor 602 includes internal memory devices such as registers and local caches (e.g., L2 cache) for efficient processing of instructions and data. The processor 602 communicates with components or otherwise interfaces with other hardware (e.g., memory 606) in the TCU 600,600' via a bus interface 604. The memory 606 may be, for example, a volatile storage medium (e.g., SRAM, DRAM, etc.) or a non-volatile storage medium (e.g., FLASH, EPROM, EEPROM, etc.) for storing instructions, parameters, and other relevant information for use by the processor 602 (e.g., canned or pre-configured messages or message segments used to automatically generate a voice path message in connection with an E911 call as described above with reference to FIGS. 2, 3A and 5A).

The processor 602 also sends and receives instructions and data to a device interface 608 (e.g., a serial bus, a parallel bus, USB™, FireWire™, etc.) that communicates using protocols to internal and external devices and other similar electronic devices. For instance, the example device interface 608 communicates with a GPS receiver 610 that receives satellite signals to determine the position of the TCU 600, 600'. In the example of FIGS. 6A and 6B, the TCU 600, 600' also uses the device interface 608 to interface with other sensors 612 (e.g., vehicle sensors such as accelerometers, navigational processing system, internal control systems of the vehicle, etc.) via the vehicle bus 620 (e.g., high-speed and medium-speed vehicle CAN-buses), or directly connect to the vehicle bus 620.

The example TCU 600, 600' can also communicates with other wireless communication services (e.g., 3GPP, 802.11 (n) wireless networks, Bluetooth®, etc.) via the transceiver 614 which can comprise a cellular modem, Bluetooth® radio modem, among other RF modems. In another example, the transceiver 614 communicates with wireless communication services via the device interface 608.

As stated above, the processor 602 employs a TCU application to operate in conjunction with the transceiver 614, the GPS receiver 610, sensors 612 and other devices to implement one or more TSSS processes such as those described above in connection with FIGS. 2 through 5, 8 and 9. In accordance with illustrative embodiments wherein the voice path audio message or TTY message is generated at the TCU 600,600' (e.g., versus located at the carrier switch), the processor 602 can implement voice path message generation in conjunction with coordinates received from the GPS receiver 610. Alternatively, a voice path message generator device can be implemented as a separate component in the TCU 600, 600'. The TCU 600, and 600*a* can also have a TTY modem (not shown) such as, for example, a cellular text telephone modem (CTM) as specified in 3GPP Technical Specification 26.226 or ITU Recommendation V.18.

If the TCU is configured to operate with a user' mobile phone as opposed to a dedicated cellular modem, the processor 602 with TCU application can be implemented using an aftermarket Android application with an OMAP processor, for example, that interfaces with GPS, CAN bus, WiFi and USB, among other devices and protocols. For example, the processor 602 with TCU application can be similar to the Ford SYNC™ computer or Accessory Protocol Interface Module (APIM), which is housed separately from the head unit or Audio Control Module (ACM) of the vehicle, interfaces with all vehicle audio sources as well as the high-speed and medium-speed vehicle CAN-buses, and employs applications and user interfaces run on the Windows Embedded Automotive operating system designed by Microsoft Corporation.

The illustrative embodiments of the present invention have thus far been described with reference to E911 applications and TCU notifications and/or messages relating to vehicle crash conditions. It is to be understood, however, that the TCUs can be used to report conditions of other types of users besides vehicle occupants, that the users can be stationary or mobile users, and that the TCU notifications and/or messages can relate to reported conditions other than vehicle crash conditions such as one or more of user medical conditions, user travel conditions (e.g., walking, cycling, boating, etc.), conditions wherein a user operates equipment other than a motor vehicle, and so on. For example, the processor 602 can be configured to interface with other types of sensors 612 such as medical condition sensors (e.g., oxygen level, glucose or other analytes, respiratory, temperature, heart rate and so on), environment sensors (e.g., temperature, light level, humidity, air quality, and so on) that are preferably portable sensors or can be inductively linked to the TCU when the TCU is proximal to the sensor. The processor 602, in such instances, can be programmed to determine if the user needs emergency assistance based on certain criteria for parameters or levels indicated by the sensors, as is commonly done in medical alert systems worn on, affixed to, or carried by a person. The memory 606 can be provided with different types of responder messages that can be automatically generated and transmitted to a PSAP by the TCU during an E911 call such as "This user is need of immediate medical attention. Please send an ambulance to the following location coordinates: longitude XX.XXX and latitude YY.YYY. Bring (insulin)/defibrillator."

Telematics platforms can implemented for vehicles, for example, with varying degrees of functionality. For example, a basic vehicle telematics platform can provide direct 911 automated collision notification as described herein in accordance with illustrative embodiments of the present invention, as well as smart phone features. Vehicle manufacturers and Original Equipment Manufacturers (OEMs) are also interested in incorporating SDARS with telematics for receiving SDARS content (channel and content selection control at a vehicle head unit), and providing automotive data services (e.g., traffic, weather, and fuel services), theft recovery and lock-out prevention, as well as direct 911 automatic collision notification as described herein in accordance with illustrative embodiments of the present invention.

Figure 7:
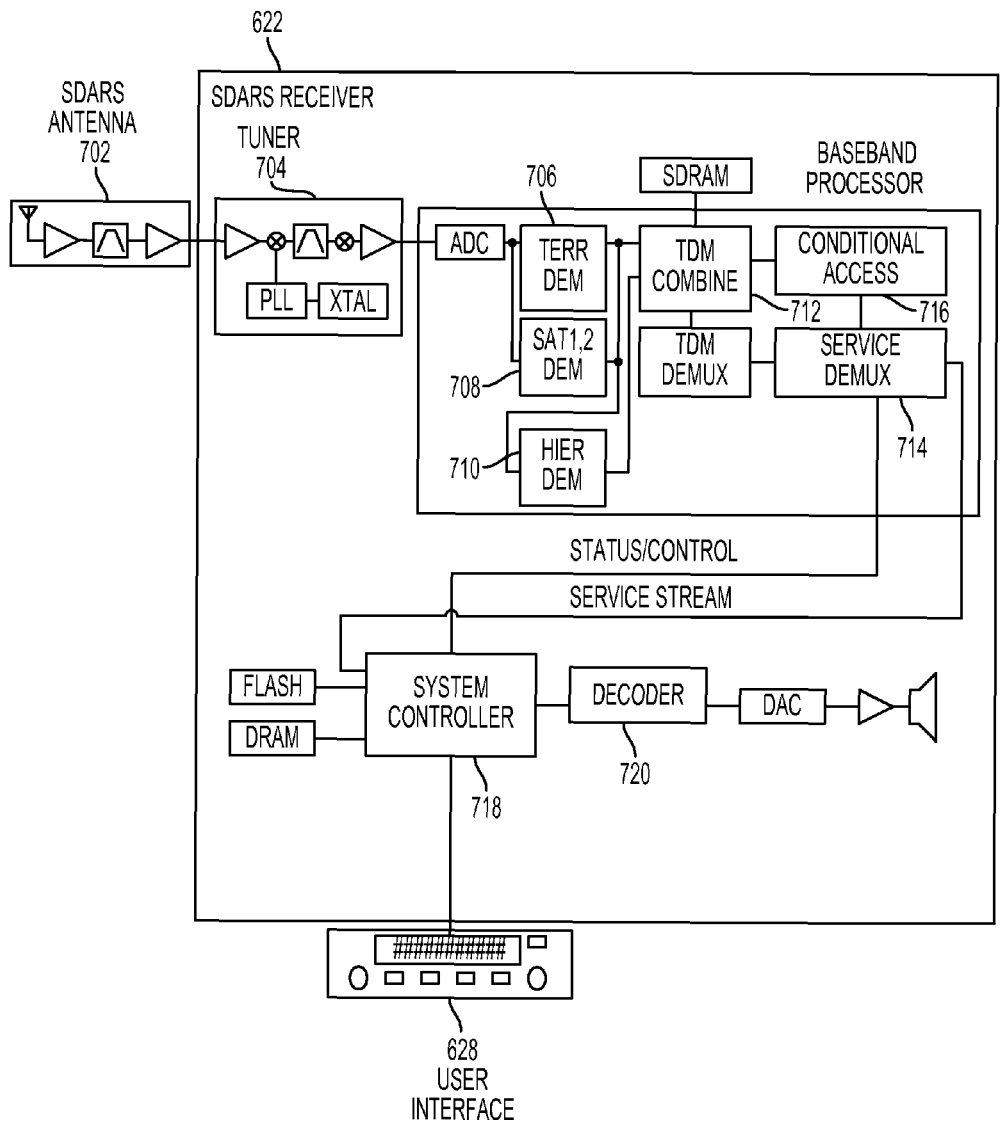
FIG. 7 shows an illustrative embodiment of a satellite digital audio radio service (SDARS) receiver configured for operation in conjunction with a TCU in a vehicle telematics platform in accordance with an illustrative embodiment of the present invention.

FIG. 7 shows an illustrative embodiment of an SDARS receiver 622 that can be incorporated in a telematics platform or TCU 600, 600'. The receiver comprises an antenna 702, tuner 704 and receiver arms for processing the SDARS broadcast stream received from at least one of two satellites, a terrestrial repeater, and optionally a hierarchical modulated stream, as indicated by the demodulators 706, 708 and 710. These received streams are demodulated, combined and decoded via the signal combiner in combination with the SDARS, and demultiplexed to recover channels from the SDARS broadcast stream, as indicated by the signal combining module 712 and service demultiplexer module 714. Processing of a received SDARS broadcast stream is described in further detail in commonly owned U.S. Pat. Nos. 6,154,452 and 6,229,824, the entire contents of which are hereby incorporated herein by reference. A conditional access module 716 can optionally be provided to restrict access to certain demultiplexed channels. For example, each receiver 622 in an SDARS system can be provided with a unique identifier allowing for the capability of individually addressing each receiver over-the-air to facilitate conditional access such as enabling or disabling services, or providing custom applications such as individual data services or group data services. The demultiplexed service data stream is provided to the system controller. The system controller 718 in the radio receiver 622 is connected to memory (e.g., Flash, SRAM, DRAM, etc.), a user interface 628, and at least one audio decoder 720.

An example algorithm for operating a TCU in accordance with illustrative embodiments of the present invention will now be described with reference to the flow chart in FIG. 8. For example, the algorithm can control operations of the processor 602 in FIG. 6A or the processor 602 and/or the controller 630 in FIG. 6B. It is to be understood, however, that the algorithm can be variously employed to control the operations of other types of TCUs and associated cellular modems.

As indicated at 802 in FIG. 8, the processor obtains TCU location information. As explained above, the TCU can receive TCU location data from its corresponding GPS receiver, and further receive optional sensor data (e.g., via the vehicle CAN bus) and dead reckoning information to facilitate identifying the position of the caller to the PSAP 170 (block 806 in FIG. 8). The TCU location data can be derived from an integrated or separate GPS receiver 610 or TCU-based assisted GPS technology. Sensor data can include, but is not limited to, wheel rotation and/or gyroscope data, as well as data from an accelerometer, among other distance and/or direction data sources that can be used, for example, for dead reckoning. Where the TCU device is deployed in a non-vehicle application such as a personal user application, the sensor data can include, for example, a pedometer as well as an accelerometer and/or gyroscope, for dead reckoning.

As indicated at 804 in FIG. 8, the TCU can be controlled via the algorithm to initiate an E911 call to a wireless carrier switch (e.g., MSC 120) in response, for example, to a sensor indication of an incident requiring emergency assistance (e.g., air bag deployment) or manual dialing of an emergency telephone number (e.g., 9-1-1 or preset emergency assistance button) by a caller. With reference to 806 in FIG. 8, the processor 602 is programmed to control the operations of the transceiver 614 (e.g., dedicated cellular modem) or a tethered mobile phone during the E911 call. For example, the processor of the TCU can selectively mute and unmute the receive (Rx) and transmit (Tx) audio of the cellular modem or mobile device, initiate and terminate calls, provide audio output on established call connections, process DTMF dial tones, as well as control other cellular device operations.

As explained above, the TCU can be programmed to identify itself to the MSC/PDE as a device that can provide dead reckoning data, in addition to convention GPS data provided by mobile devices to the MSC, as indicated at 808. This identification can be performed using a flag or data field set (e.g., a field in a control channel message), or by having an assigned TCU phone number within a preset range. As indicated at 810, the TCU location information (e.g., current GPS position, and dead reckoning tracking coordinates) are sent to the MSC.

As explained in connection with FIG. 4, vehicle location data (e.g., PDE estimated location data) is provided to the ALI 150 via a data path, but can also be provided to the PSAP 170 using a voice path (e.g., via a MSC 120 operating in conjunction with an E911 router 160, or other cellular infrastructure switching or routing device(s)). After an E911 call is initiated, the TCU can send a voice path message to a PSAP via the carrier switch, as indicated at block 814, or send a request or instruction via a data channel for the carrier switch or related carrier equipment to generate a voice path message to the PSAP, as indicated at blocks 812 and 810. A voice path message that comprises TCU location information can be generated by the TCU (block 816) as described, for example, in connection with FIGS. 2 and 3A, or generated by the carrier switch or related carrier equipment (block 810), as described, for example, in connection with FIGS. 3B and 5. The voice path message can be pre-recorded or synthesized audio having location data incorporated therein (e.g., from converted digital data), for example, or TTY-formatted data or data formatted using another textphone protocol. Further, the message can also comprise other incident information (e.g., status of vehicle occupants, roll information, impact information, speed at impact, and so on).

The carrier switch 120 can provide the PDE estimated location to the MPC 140 and ALI 150 via the data channel, or the PDE 130 can provide the PDE estimated location directly to the MPC 140. With reference to block 816 in FIG. 8, the message generated by the TCU can comprise a final PDE estimated location (e.g., improved or conventional PDE estimated location). With further reference to block 816, the final PDE estimated location can be provided to the TCU for incorporation into a voice path message (e.g., a voice path audio message or TTY-formatted message), or can be incorporated into a voice path message generated by the carrier switch in response to a data channel request from the TCU.

With reference to block 818 in FIG. 8, the TCU is programmed to repeat the voice path audio message until, for example, a response is received from the PSAP, or the message has been repeated a designated number of times. For example, after the carrier switch (e.g., MPC 120) dials the selected PSAP 170 and the voice path message is played (e.g., with PSAP operator instructions as exemplified in connection with FIGS. 2, 3A and 3B), the PSAP may send a DTMF tone as instructed in the voice path message (e.g., "press '1' at any time to speak with the vehicle occupants," or "press '2' to receive additional incident information").

The TCU is programmed to process any DTMF tones received from the PSAP. For example, if a DTMF tone for "1" is received in response to the afore-mentioned message, the TCU is configured to unmute the Rx and Tx audio of the cellular modem to allow the PSAP operator to communicate verbally with vehicle occupants, for example. In addition, the TCU can be configured to send a voice path message with additional sensor data or incident information in response to designated DTMF tones received from the PSAP.

An example algorithm for operating a carrier switch (e.g. MSC 402 in FIG. 4 or the MCU telematics device 1000 exemplified in FIG. 10) or other switching or routing device in the cellular infrastructure of a wireless carrier will now be described with reference to the flow chart in FIG. 9 in accordance with illustrative embodiments of the present invention. As indicated at 902, the MSC 402 can be controlled via the algorithm to receive an E911 call from a TCU.

As explained above, the TCU can generate TCU location data and optional sensor data (e.g., block 802 in FIG. 8) to facilitate identifying the position of the caller to a PSAP 170 selected (e.g., by a E911 router 160) to handle the E911 call. With reference to block 904, the MCU 402 is programmed to process a signal received from the TCU (e.g., TCU 500) that comprises a voice path message or a request for message generation at the MSC 402, and vehicle location data and/or sensor data.

With reference to block 906, the MSC 402 can be controlled by the algorithm to determine if the received signal is from a TCU with dead reckoning to determine the manner of PDE post-processing of TCU location information to be performed. As described above in connection with FIG. 4, a TCU can initiate a call to the MSC with a flag or data field (e.g., a field in a control channel message, and the like) set to indicate that the call type is a TCU emergency call.

If the TCU cannot provide dead reckoning information, the MSC/PDE can process the TCU location data in a conventional manner to generate a conventional PDE estimated location (e.g., using the GPS coordinate provided by the TCU or triangulation) that is provided to the ALI database, as indicated at 908. If the TCU provides dead reckoning information, then the PDE proceeds to determine an improved PDE estimated location, as indicated at 920, which is provided to the ALI as indicated at 936. For example, the dead reckoning information can be processed at the MSC/PDE by comparing the track coordinates with information in a map database to determine the best estimate of TCU location such as the last trajectory coordinate reverse geocoded to the nearest street or other geographic location that is most likely to be a TCU position. This comparison can be done manually or automatically. For example, an algorithm can be employed that compares one or more of the trajectory coordinates in the dead reckoning data with a series of geographic criteria (e.g., available in a conventional PDE map database such as which street is closest to the last trajectory coordinate; is the street a one-way street with direction that conflicts with direction information in TCU data, and so).

With reference to blocks 938 and 946, either the TCU or the carrier switch (e.g., MSC 402) can be configured to send a voice path message to a selected PSAP in connection with an E911 call. As shown in block 938, if the MSC 402 is to send the voice path message, then the MSC 402 is controlled to generate the message with the PDE estimated location for routing via the voice path to the selected PSAP. The message can be repeated by the MSC a designated number of times or until a response is received from the PSAP, for example, as shown in blocks 942 and 944. If the TCU is controlled to send the voice path message, then the MSC sends the PDE estimated location to the TCU (block 948).

FIG. 10 depicts a MSC telematics device 1000 constructed in accordance with an illustrative embodiment of the present invention. For example, the MSC telematics device 1000 can be implemented as a rack-mounted shelf unit, or telecommunications card for deployment in a slot in a shelf, of a telecommunications equipment cabinet at an MSC 402. The MSC telematics device 1000 comprises a microcontroller 1010 and memory (e.g., memory 1012 for storing a map database and a memory 1014 for storing pre-recorded or otherwise predetermined messages or message segments). The memories 1012 and 1014 can separate or combined. As indicated at 1024, the microcontroller 1010 can be programmed to receive location and incident data from a TCU as described above, as well as TCU location dead reckoning tracking information (e.g., as indicated at 512 in FIG. 5), using a wireless network logical or control data channel, for example.

With continued reference to FIG. 10 at 1024, the microcontroller 1010 is programmed to perform location processing (e.g., as described with reference to FIG. 9) using an integral PDE (e.g., as represented by the location processing module 1024) or a separate PDE (not shown), but as shown at 506 in FIGS. 5A and 5B, for example, with which the location processing module 1024 is programmed to communicate via the MSC and exchange data as described in connection with FIG. 9. Further, the map database 1012 can also be part of the separate PDE. Once the MSC telematics device 1000 determines the PDE estimated location, the MSC telematics device 1000 can send the final PDE estimated location to the TCU, for example, for incorporation into a voice path audio or TTY-formatted message, as indicated at 1030, or the MSC telematics device 1000 can automatically generate a voice path audio message (e.g., as illustrated in FIG. 2) as indicated at 1026. As described above in connection with FIG. 3B, the MSC telematics device 1000 can also be configured to automatically generate a voice path textphone message using a TTY modem 1016. The optional TTY modem 1016 can be a cellular text telephone modem (CTM) as specified in 3GPP Technical Specification 26.226 or ITU Recommendation V.18, for example.

The microcontroller is programmed to control the audio received from a microphone at the TCU, as well as audio transmitted to the TCU (e.g., from a PSAP operator), as indicated by the switch control modules 1020a and 1020b to selectively mute and unmute the audio received by the E911 caller. For example, the audio from the TCU (e.g., TCU Tx audio) is muted via switch control modules 1020a to allow the PSAP to hear the voice path message generated by the MSC telematics device 1000. Further, the TCU Rx audio from the PSAP can be muted until the PSAP operator wishes to converse with the E911 calling party. In addition, the microcontroller 1010 is programmed with DTMF decoding to monitor the voice path from the PSAP for DTMF responses to voice path messages as indicated at 1028. For example, as explained above, a voice path message from the MSC telematics device 1000 can instruct the PSAP operator to depress a particular numeric key and send a corresponding DTMF tone when the PSAP operator wishes to open the voice channel to converse with the E911 calling party.

The illustrative embodiments described herein have been with reference to Enhanced 911, E9-1-1 or E911, that is, a system used in North America to link emergency callers with the appropriate public resources. It is to be understood that aspects of illustrative embodiments of the present invention can be used with other emergency telephone number systems in other countries that try to automatically associate a location with the origin of the emergency call. This location may be a physical address or other geographic reference information such as X/Y map coordinates (e.g., latitude and longitude). The caller's telephone number can be used in various ways to derive a location that can be used to dispatch police, fire, emergency medical and other response resources.

In the illustrative embodiments described herein, the incoming 911 call is typically answered at the public safety answering point (PSAP) of the governmental agency that has jurisdiction over the caller's location. When the 911 call arrives at the appropriate PSAP, it is generally answered by a specially trained official (e.g., typically known as a Telecommunicator). In some jurisdictions, the Telecommunicator is also the dispatcher of public safety response resources. When the call arrives at the PSAP, special computer software is used to display the location of the caller immediately upon arrival of the call. It is to be understood that aspects of illustrative embodiments of the present invention can be used with other entities besides PSAPs (e.g., private entities such as the call centers of commercial TSPs or access points), with different location and display data, and different responders (e.g., depending on the emergency telephone number system or the services provided by other call centers or access points).

The components of the TSSS system and methods employed in accordance with the illustrated embodiments of the present invention can be implemented, at least in part, in digital electronic circuitry, analog electronic circuitry, or in computer hardware, firmware, software, or in combinations of them. The components of the TSSS system can be implemented, for example, as a computer program product such as a computer program, program code or computer instructions tangibly embodied in an information carrier, in a machine-readable storage device or in a propagated signal, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the TSSS system described in accordance with aspects of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Although certain methods, systems, and articles of manufacture have been described herein, the scope of coverage of this patent is not limited thereto. To the contrary, this patent covers all methods, systems, and articles of manufacture fairly falling within the scope of the appended claims either literally or under the doctrine of equivalents.

What is claimed is:

1. A method of providing wireless telematics device location information to an access point, comprising:
   receiving, by a wireless network, location information generated at a telematics device comprising at least one of (i) current position coordinates, or (ii) tracking information comprising at least one previous position coordinate;
   determining, by the wireless network, if the telematics device can provide tracking information; and
   when the location information generated at the telematics device includes the tracking information:
   determining, by the wireless network, an estimated location of the telematics device using the tracking information with a map database; and
   when the location information generated at the telematics device does not include the tracking information:
   determining, by the wireless network, a network-based location of the telematics device using received signal information corresponding to one or more signals received from the telematics device at one or more cellular base stations; and
   determining, by the wireless network, an estimated location of the telematics device using the current position coordinates and the network-based location,
   wherein the determining if the telematics device can provide tracking information includes determining, by the wireless network, whether data transmitted by the telematics device indicates that predefined handling of tracking information is required, the data including (i) a flag or data field set in a control channel message or (ii) a callback number that falls within a preset range of callback numbers,
   wherein the tracking information includes dead reckoning information that includes a series of coordinates representing points along a path, vector, or trajectory of the telematics device, and
   wherein the processing of the tracking information with a map database includes comparing the series of coordinates in the dead reckoning information with data in the map database
   so as to determine a last trajectory coordinate of the telematics device reverse geocoded to a nearest street or geographic location proximate to the telematics device.

2. The method of claim 1, further comprising transmitting the estimated location by the wireless network to the access point on a voice channel.

3. The method of claim 2, further comprising transmitting the estimated location to the access point on a voice channel using at least one of an audio message and a textphone message that comprises the estimated location and is generated at the wireless network.

4. The method of claim 2, further comprising: transmitting, by the wireless network, the estimated location to the telematics device to enable the telematics device to generate at least one of an audio message and a textphone message that comprises the estimated location.

5. The method of claim 1, further comprising transmitting the estimated location by the wireless network to the access point in an audio message on a voice channel, and retransmitting the audio message on the voice channel as needed.

6. The method of claim 1, wherein the determining if the telematics device can provide tracking data includes checking, by the wireless network, for additional data received from the telematics device that identifies that the telematics device can provide tracking data.

7. The method of claim 1, wherein the tracking information includes a last recorded location and at least one of: a predetermined number of historical record locations, or a series of position co-ordinates representing tracking locations along a vector or path.

8. The method of claim 1, wherein the determining if the telematics device can provide tracking information includes checking, by the wireless network, if an identifier associated with the telematics device falls within a preset range.

9. The method of claim 8, wherein the identifier is a callback number.

10. A method of providing wireless telematics device location information to an access point during an emergency call, comprising:
    establishing a voice channel to an access point in response to a telematics device initiating an emergency call via a wireless network;
    receiving, by the wireless network, location information generated at the telematics device comprising recent position coordinates;
    determining, by the wireless network, if the telematics device can provide tracking information; post-processing the position coordinates with a map database by the wireless network to obtain an estimated location of the telematics device;
    generating, by the wireless network, at least one of an audio message and a textphone message that comprises the telematics device location information; and
    transmitting, by the wireless network, the at least one of an audio message and a textphone message to the access point on the voice channel;
    wherein the determining if the telematics device can provide tracking information includes determining, by the wireless network, whether data transmitted by the telematics device indicates that predefined handling of tracking information is required, the data including (i) a flag or data field set in a control channel message or (ii) a callback number that falls within a preset range of callback numbers,
    wherein the tracking information comprises dead reckoning information that includes a series of coordinates representing points along a path, vector, or trajectory of the telematics device, and
    wherein the processing of the position coordinates with a map database includes comparing the series of coordinates in the dead reckoning information with data in the map database
    so as to determine a last trajectory coordinate of the telematics device reverse geocoded to a nearest street or geographic location proximate to the telematics device.

11. The method of claim 10, further comprising selectively muting at least one of receive audio and transmit audio at the telematics device during transmission of the at least one of an audio message and a textphone message to the access point on the voice channel.

12. A method of providing wireless telematics device location information to an access point comprising:
- receiving, by a wireless network, location information generated at a telematics device comprising tracking information including at least one previous position coordinate;
- determining, by the wireless network, an estimated location of the telematics device by post-processing the tracking information, including processing the at least one previous position-coordinate with a map database;
- determining, by the wireless network, if the telematics device can provide tracking information by determining whether data transmitted by the telematics device indicates that predefined handling of tracking information is required, the data including (i) a flag or data field set in a control channel message or (ii) a callback number that falls within a preset range of callback numbers,
- wherein the at least one previous position coordinate is included in dead reckoning information that comprises a series of coordinates representing points along a path, vector, or trajectory of the telematics device, and
- wherein the processing of the at least one previous position coordinate with a map database includes comparing the series of coordinates in the dead reckoning information with data in the map database
- so as to determine a last trajectory coordinate of the telematics device reverse geocoded to a nearest street or geographic location proximate to the telematics device; and
- performing at least one of:
  - (i) transmitting, by the wireless network, the estimated location of the telematics device to the access point on both a data channel and a voice channel; or
  - (ii) transmitting, by the wireless network, the estimated location of the telematics device to the telematics device and routing a voice call from the telematics device to the access point.

13. The method of claim 12, wherein said tracking information includes a last recorded location and at least one of: a predetermined number of historical record locations, or a series of position coordinates representing tracking locations along a vector or path.

14. The method of claim 12, wherein the post-processing of the tracking information includes processing the at least one previous position-coordinate with a map database.

* * * * *